(12) United States Patent
Wakabayashi et al.

(10) Patent No.: US 6,791,772 B2
(45) Date of Patent: Sep. 14, 2004

(54) OBJECTIVE LENS DRIVER

(75) Inventors: Kanji Wakabayashi, Kyoto (JP); Hiroshi Yamamoto, Yawata (JP); Yoshihiro Ikawa, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/397,810

(22) Filed: Mar. 25, 2003

(65) Prior Publication Data

US 2003/0184886 A1 Oct. 2, 2003

(30) Foreign Application Priority Data

Mar. 26, 2002 (JP) .......................................... 2002-085241
Apr. 16, 2002 (JP) .......................................... 2002-113004

(51) Int. Cl.$^7$ .............................. G02B 7/02; G11B 7/00; G11B 21/02; G11B 21/16
(52) U.S. Cl. ...................... 359/824; 359/813; 359/814; 369/44.15; 369/215; 369/221; 369/244
(58) Field of Search ................................. 359/813, 814, 359/823, 824, 819; 369/44.14, 44.15, 44.16, 215, 221, 244

(56) References Cited

U.S. PATENT DOCUMENTS

| 5,903,539 A | * | 5/1999 | Tanaka | ........................ 369/221 |
| 5,949,590 A | * | 9/1999 | Hong | .......................... 359/814 |
| 6,344,936 B1 | | 2/2002 | Santo et al. | |
| 6,532,118 B2 | * | 3/2003 | Ohno | .......................... 359/824 |
| 6,570,720 B2 | * | 5/2003 | Kawano | ...................... 359/813 |
| 6,625,105 B2 | * | 9/2003 | Suzuki et al. | ................ 369/244 |

FOREIGN PATENT DOCUMENTS

JP          05-314514          11/1993

* cited by examiner

*Primary Examiner*—Loha Ben
(74) *Attorney, Agent, or Firm*—Akin Gump Strauss Hauer & Feld, LLP

(57) ABSTRACT

An objective lens driver includes a movable body, a base, a supporting portion, a first multipolar magnet and a second multipolar magnet. The movable body includes an objective lens, a lens holder, and a coil substrate. The coil substrate includes a focusing coil and a tracking coil. The supporting portion allows the movable body to move in a focusing direction and a tracking direction with respect to the base. The focusing direction is parallel to the optical axis of the objective lens, while the tracking direction is perpendicular to the focusing direction. The first and second multipolar magnets sandwich the coil substrate between them. The focusing and tracking coils are arranged as two flat coils on two mutually parallel separate planes so as to overlap with each other at least partially in a direction that is perpendicular to the focusing and tracking directions.

21 Claims, 15 Drawing Sheets

OBJECTIVE LENS DRIVER

BACKGROUND OF THE INVENTION

1. Field of the Invention

The present invention relates to an objective lens driver for use in an optical disc drive for reading and/or writing information optically from/onto a disk storage medium by focusing a light beam thereon.

2. Description of the Related Art

An optical disc drive for reading and/or writing information optically from/onto a disk storage medium such as a compact disc (which will be simply referred to herein as an "optical disc") includes an optical head. The optical head moves in the radial direction of the disc, thereby focusing a light beam onto a predetermined track to read or write information therefrom/thereon. Also, the optical head detects the light beam that has been reflected from the disc and converts the light detected into an electric signal.

The optical head includes a light source and an objective lens for use to focus the light beam that has been emitted from the light source. The optical head drives the objective lens such that a beam spot, formed on the disc by the light beam focused thereon, follows predetermined tracks on the disc while maintaining a constant focusing state. More specifically, the objective lens is driven both perpendicularly and parallelly to the information recording side of the disc in such a manner as to correct a focus error and a tracking error, which may be caused by the flutter and eccentricity of the disc, respectively. The former direction that is perpendicular to the information recording side of the disc is parallel to the optical axis of the objective lens, and will be referred to herein as a "focusing direction". On the other hand, the latter direction that is parallel to the information recording side of the disc is the disc radial direction, and will be referred to herein as a "tracking direction". Such a mechanism which is specially designed to drive the objective lens will be referred to herein as an "objective lens driver". It should be noted that the objective lens herein forms an integral part of the objective lens driver.

Recently, the optical discs should have even higher storage capacities and the optical disc drives should achieve even higher transfer rates year after year. To meet these demands, it has become increasingly necessary to perform even more precise positioning control on the objective lens and transfer information, which has been read out from, or is going to be written on, an optical disc rotating at a high speed, from/to the optical disc at an even higher rate.

When the optical disc is rotated at a high speed, the acceleration of the flutter and the acceleration of the eccentricity both increase in proportion to the square of the rotational speed of the disc. Accordingly, if the acceleration at which the objective lens of the objective lens driver is moving is not sufficiently sensitive to these accelerations, then the objective lens cannot follow any variation in flutter or eccentricity closely, thus causing control errors. In that case, the light beam will be out of focus with the disc surface or go off the predetermined tracks on the disc to possibly deteriorate the quality of a read or write signal.

On the other hand, the optical disc drives are recently required to further reduce their sizes. To meet those demands, the objective lens drivers also need to reduce their sizes (e.g., their thicknesses, in particular). Thus, it has become more and more difficult to obtain an objective lens driver that can exhibit sufficient acceleration sensitivity within a limited space.

Hereinafter, a conventional objective lens driver with a reduced thickness will be described with reference to FIGS. 15, 16, 17A, 17B and 17C. FIG. 15 is an exploded perspective view illustrating the structure of a conventional objective lens driver. FIG. 16 is a plan view of the objective lens driver shown in FIG. 15. FIG. 17B is a schematic plan view showing the positional relationship among magnets, a focusing coil and a tracking coil in the conventional objective lens driver. FIGS. 17A and 17C are transparent plan views of the objective lens driver as respectively viewed in the directions U and V shown in FIG. 17B.

In the conventional objective lens driver, an objective lens 1 is fitted into a lens holder 301 as shown in FIGS. 15 and 16. The lens holder 301 has a central through hole to receive a substantially pentagonal prism focusing coil 302 with a pair of flat and substantially quadrangular prism tracking coils 303. The two tracking coils 303 are connected in series together.

Two magnets 304 and 305 are secured to a base 306 so as to sandwich the focusing coil 302 and the tracking coils 303 with a gap provided between them. A holder 308 is secured to the base 306. A fixing substrate 310 is attached to the back of the holder 308.

A pair of junction terminal plates 309 is secured onto the two side surfaces of the lens holder 301. Four wires 307a, 307b, 307c and 307d are connected to the junction terminal plates 309 such that one end of each of the wires 307a through 307d is soldered up with associated one of the junction terminal plates 309. The other end of the wires 307a through 307d is soldered up with the fixing substrate 310.

Thus, a movable body is made up of the objective lens 1, lens holder 301, focusing coil 302, tracking coils 303 and junction terminal plates 309. That is to say, this movable body is supported by the four wires 307a through 307d so as to be movable both in a focusing direction F and in a tracking direction T with respect to the base 306.

The wires 307a through 307d may be made of an elastic metal material such as beryllium copper or phosphorus bronze, for example. The two terminals of the focusing coil 302 and the four terminals of the pair of serially connected tracking coils 303 are electrically connected to the fixing substrate 310 by way of the junction terminal plates 309 and the wires 307a through 307d.

Also, as shown in FIG. 16, the magnets 304 and 305 are arranged such that different poles of the magnets 304 and 305 face with other and have substantially the same size J in the tracking direction T.

In the conventional objective lens driver having such a structure, a driving force is generated from portions of the focusing coil 302 and tracking coils 303, which are sandwiched between the magnets 304 and 305. The driving force generating point is located substantially at the center of the movable body. By shifting the location of the objective lens 1 from that driving force generating point, no mechanical interference will occur between a reflective mirror (not shown) for reflecting the light beam in the focusing direction F and the driving means consisting of the magnets 304 and 305, focusing coil 302 and tracking coils 303. In this manner, an objective lens driver with a reduced thickness, which can be used effectively in an optical head with a reduced thickness, is obtained.

Hereinafter, it will be described with reference to FIGS. 17A through 17C how the conventional objective lens driver having such a configuration operates.

First, a focusing drive operation thereof will be described. As shown in FIG. 17A, when a current is supplied to the focusing coil 302 so as to flow in the direction pointed by the arrow If, a driving force is generated in the direction pointed by the arrow Pf along one side of the focusing coil 302 because the opposed magnetic pole is the N pole. As a result, the lens holder 301 is driven in the focusing direction F by the driving force Pf that has been generated in the focusing coil 302.

Next, a tracking drive operation thereof will be described. As shown in FIG. 17C, when a current is supplied to the tracking coils 303 so as to flow in the direction pointed by the arrow It, a driving force is generated in the direction pointed by the arrow Pt along one side of the tracking coils 303 because the opposed magnetic pole is the S pole. As a result, the lens holder 301 is driven in the tracking direction T by the driving force Pt that has been generated in the tracking coils 303.

To allow the conventional objective lens driver to drive the objective lens at an increased acceleration, the following problems must be overcome.

Firstly, in the conventional objective lens driver, the driving force in the focusing direction F relies solely on the driving force that is generated along just one side of the pentagonal prism focusing coil 302. Accordingly, the ratio of the effective length of the focusing coil 302, contributing to the generation of the driving force, to the overall length thereof is very limited. That is to say, the conventional objective lens driver cannot generate the driving force so efficiently.

When the width J of the magnets 304 and 305 is increased to increase the effective length of the coil 302 (when the width J of the magnet 304, located closer to the objective lens 1, is increased, in particular), connecting portions 301a and 301b, which are provided between the objective lens 1 in the lens holder 301 and the focusing and tracking coils 302 and 303, should have a reduced thickness. However, if these connecting portions 301a and 301b have a reduced thickness, then the transmission path of the driving force will have a decreased rigidity. In that case, a high-order resonance frequency of the objective lens driver will decrease and the servo band thereof will also decline, thus deteriorating the ability of the objective lens 1 to follow any variation in the flutter or eccentricity of the disc. Consequently, the quality of the resultant read signal or write signal might deteriorate.

On the other hand, if the width J of the magnet 305 is increased, then the focusing coil 302, surrounding the magnet 305, also needs to have an increased surrounding length. Thus, the ratio of the effective length of the focusing coil 302 to the overall length thereof cannot be increased. Also, even if an increase voltage is applied to the focusing coil 302, the sensitivity of the acceleration generated cannot be increased sufficiently.

Furthermore, in the conventional objective lens driver, just one side of each of the two tracking coils 303 contributes to the generation of the driving force. Thus, the ratio of the effective length of each tracking coil 303 to the overall length thereof cannot be increased, either. For that reason, even if an increase voltage is applied to the tracking coils 303, the sensitivity of the acceleration generated cannot be increased sufficiently.

SUMMARY OF THE INVENTION

In order to overcome the problems described above, an object of the present invention is to provide an objective lens driver that can exhibit increased acceleration sensitivity and good follow-up performance even against a high-speed-rotating optical disc and thereby can minimize the unwanted deterioration in quality of the read or write signal.

An objective lens driver according to a preferred embodiment of the present invention preferably includes a movable body, a base, a supporting portion, a first multipolar magnet and a second multipolar magnet. The movable body preferably includes an objective lens to focus a light beam, a lens holder to hold the objective lens thereon, and a coil substrate. The coil substrate preferably includes a focusing coil and at least one tracking coil and is preferably secured onto the lens holder. The supporting portion preferably supports the movable body such that the movable body is movable in a focusing direction and a tracking direction with respect to the base. The focusing direction is parallel to the optical axis of the objective lens, while the tracking direction is perpendicular to the focusing direction. The first and second multipolar magnets are preferably secured to the base so as to sandwich the coil substrate with a gap provided between each of the first and second multipolar magnets and the coil substrate. The focusing and tracking coils are arranged as two flat coils on two mutually parallel separate planes so as to overlap with each other at least partially in a direction that is perpendicular to the focusing and tracking directions.

In one preferred embodiment of the present invention, the first multipolar magnet is preferably provided between the objective lens and the coil substrate.

In a specific preferred embodiment, the focusing coil is preferably located closer to the first multipolar magnet than the tracking coil is, while the tracking coil is preferably located closer to the second multipolar magnet than the focusing coil is.

In another specific preferred embodiment, each of the first and second multipolar magnets is preferably divided into a plurality of magnetic pole regions. The first multipolar magnet preferably includes at least two magnetic pole regions having mutually opposite polarities that are arranged in the focusing direction. The second multipolar magnet preferably includes at least two magnetic pole regions having mutually opposite polarities that are arranged in the tracking direction.

In this particular preferred embodiment, the at least two magnetic pole regions of the second multipolar magnet may include: a first magnetic pole region; and a second magnetic pole region, which has a U-cross section with a flat bottom extending in the tracking direction and which surrounds the first magnetic pole region. The first and second magnetic pole regions are preferably magnetized so as to display mutually opposite polarities.

In an alternative preferred embodiment, the at least two magnetic pole regions of the second multipolar magnet may include six magnetic pole regions obtained by dividing the second multipolar magnet into three columns in the tracking direction and into two rows in the focusing direction. In that case, the six magnetic pole regions are preferably magnetized such that each pair of magnetic pole regions, adjacent to each other in the focusing or tracking direction, displays mutually opposite polarities. One of the six magnetic pole regions, which belongs to the central one of the three columns and to the upper one of the two rows, is preferably used as a first magnetic pole region.

In another preferred embodiment, the first multipolar magnet preferably has the same structure as the second multipolar magnet.

In still another preferred embodiment, the coil substrate preferably includes two tracking coils, including the at least one tracking coil, and the two tracking coils are preferably arranged in the tracking direction.

In yet another preferred embodiment, as measured in the tracking direction, the width M of the first multipolar magnet, the width N of the second multipolar magnet and the width L of the first magnetic pole region preferably satisfy the inequality L<M<N.

In yet another preferred embodiment, the at least two magnetic pole regions of the second multipolar magnet may include six magnetic pole regions obtained by dividing the second multipolar magnet into two rows having approximately equal widths in the focusing direction and into three columns in the tracking direction. The widths of the three columns as measured in the tracking direction preferably substantially satisfy a ratio of one to two to one. The six magnetic pole regions are preferably magnetized such that each pair of magnetic pole regions, adjacent to each other in the focusing or tracking direction, displays mutually opposite polarities. On the other hand, the at least two magnetic pole regions of the first multipolar magnet may consist of two magnetic pole regions obtained by dividing the first multipolar magnet into two rows having approximately equal widths in the focusing direction. The two magnetic pole regions are preferably magnetized so as to display mutually opposite polarities.

In this particular preferred embodiment, the first multipolar magnet is preferably almost as tall in the focusing direction as the second multipolar magnet. As measured in the tracking direction, the width of the first multipolar magnet is preferably approximately equal to the width of the two magnetic pole regions belonging to the central column of the second multipolar magnet.

In a specific preferred embodiment, the first multipolar magnet is preferably disposed so as to face the two magnetic pole regions belonging to the central column of the second multipolar magnet.

Specifically, the supporting portion preferably supports the movable body such that the movable body is rotatable on a rotational axis that is defined to be perpendicular to the focusing and tracking directions. The coil substrate preferably includes four tracking coils including the at least one tracking coil. The four tracking coils are preferably arranged symmetrically about a first axis and a second axis. The first axis preferably passes an intersection between the rotational axis and the coil substrate and is preferably defined to be parallel to the focusing direction. The second axis preferably also passes the intersection and is preferably defined to be parallel to the tracking direction.

More specifically, two of the four tracking coils are preferably located over the second axis and connected in series together to form an upper pair of coils, while the two other tracking coils are preferably located under the second axis and connected in series together to form a lower pair of coils.

In this particular preferred embodiment, by supplying currents having the same phase to the upper and lower pairs of coils, the objective lens driver preferably drives the movable body in the tracking direction. By supplying currents having opposite phases to the upper and lower pairs of coils, the objective lens driver preferably rotates the movable body on the rotational axis.

Specifically, the focusing coil is preferably wound around the rotational axis.

An optical head according to a preferred embodiment of the present invention preferably includes: the objective lens driver according to any of the preferred embodiments described above; and a light source for emitting the light beam.

An optical disc drive according to a preferred embodiment of the present invention preferably includes: a motor for rotating an optical disc thereon; the optical head of the present invention, which is disposed at such a position as to form a focal point of the light beam on the optical disc; and means for moving the focal point of the light beam on the optical disc in a radial direction of the optical disc.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Embodiment 1

Figure 1:
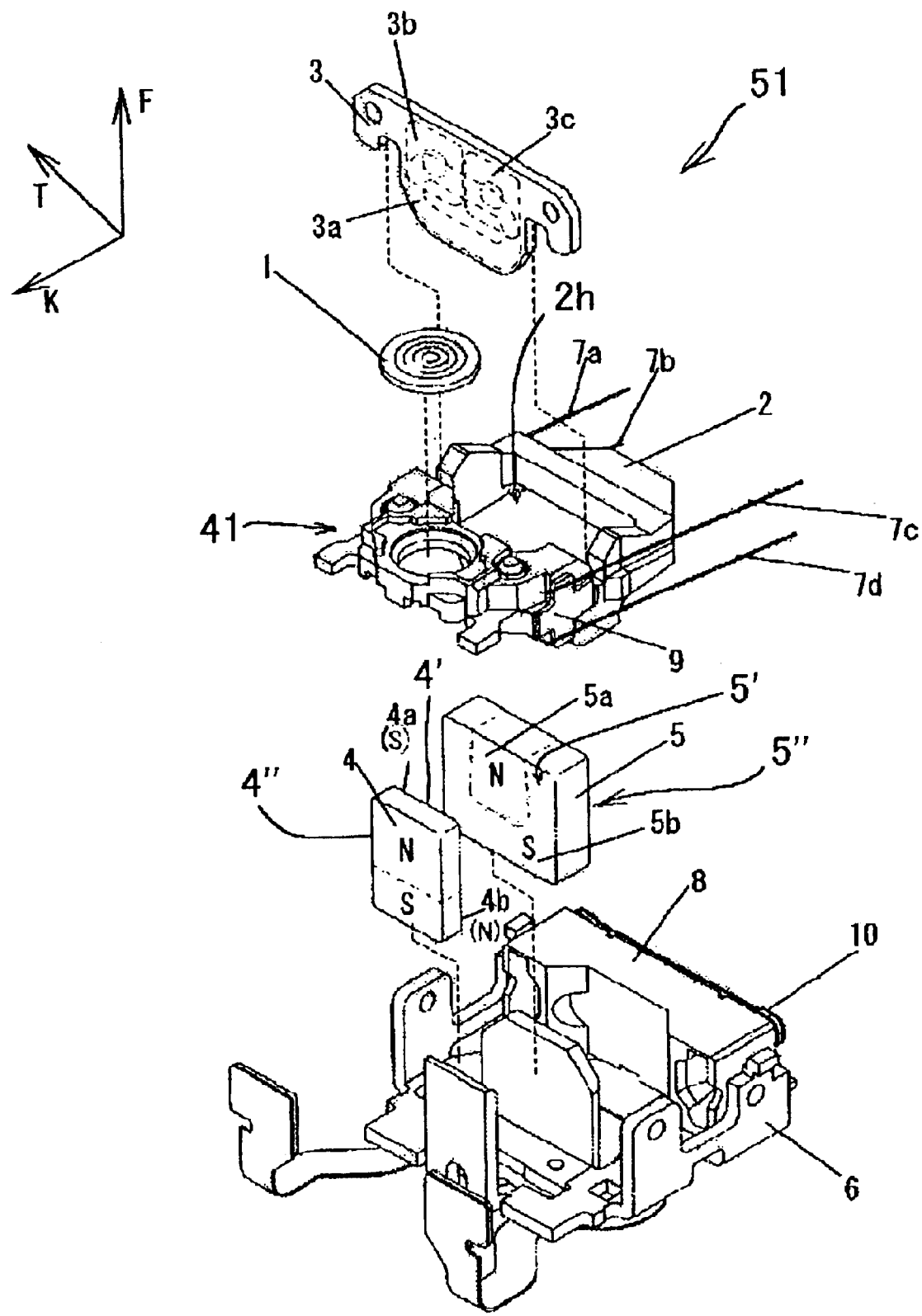
FIG. 1 is an exploded perspective view illustrating an objective lens driver according to a first specific preferred embodiment of the present invention.
Figure 2A:
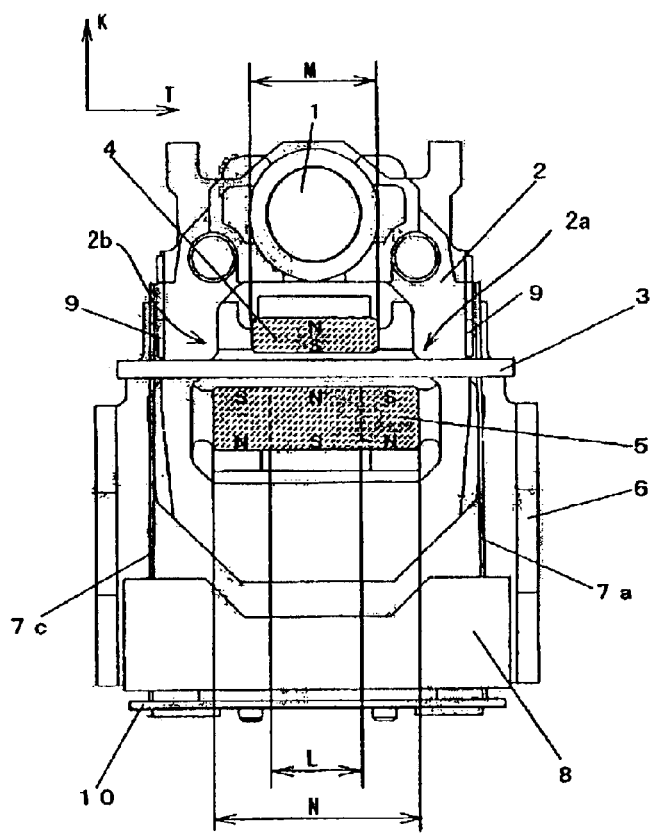
FIG. 2A is a plan view of the objective lens driver shown in FIG. 1.

FIG. 1 is an exploded perspective view illustrating an objective lens driver 51 according to a first specific preferred embodiment of the present invention. FIG. 2A is a plan view of the objective lens driver 51 shown in FIG. 1. In FIGS. 1 and 2A, "F" denotes the focusing direction, "T" denotes the tracking direction and "K" denotes a direction that is perpendicular to the focusing and tracking directions F and T. These three directions F, T and K respectively correspond to the x-axis direction, y-axis direction and z-axis direction of a three-dimensional orthogonal coordinate system. In the following description, a plane to be defined by the focusing and tracking directions F and T, a plane to be defined by the tracking direction T and the direction K, and a plane to be defined by the focusing direction F and the direction K will sometimes be referred to herein as an "F-T plane", a "T-K plane" and a "K-F plane", respectively.

The objective lens driver 51 includes a lens holder 2 made of a molded resin, for example, an objective lens 1, a coil substrate 3, a first multipolar magnet 4, a second multipolar magnet 5 and a base 6.

The objective lens 1 is held by the lens holder 2 parallelly to the T-K plane, so that an optical axis of the objective lens 1 is parallel to the focusing direction F. The lens holder 2 has a substantially rectangular opening 2h, which runs through the lens holder 2 in the focusing direction F and which is adjacent to a portion of the lens holder 2 that receives the objective lens 1. A portion of the coil substrate 3 is inserted into the opening 2h and attached to substantially the center of the lens holder 2. The coil substrate 3 preferably stands parallelly to the T-F plane, i.e., perpendicularly to the objective lens 1.

Figure 2B:
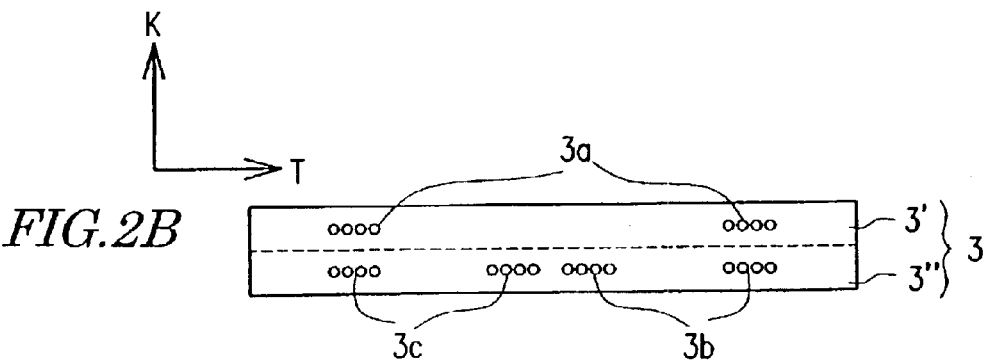
FIGS. 2B and 2C are respectively a cross-sectional view and a plan view of a coil substrate for use in the objective lens driver shown in FIG. 1.

FIG. 2B illustrates a T-K cross section of the coil substrate 3. As shown in FIG. 2B, the coil substrate 3 includes a first layer 3' and a second layer 3', which include a focusing coil 3a and tracking coils 3b and 3c, respectively. The focusing coil 3a and the tracking coils 3b and 3c are wound around an axis, which is defined in the direction K (i.e., which crosses the coil substrate 3 at right angles), so as to define flat shapes parallelly to the pair of opposed surfaces of the coil substrate 3. The tracking coils 3b and 3c are connected in series to each other. As shown in FIG. 1, the focusing coil 3a is located closer to the objective lens 1 than the tracking coils 3b and 3c are.

Figure 2C:
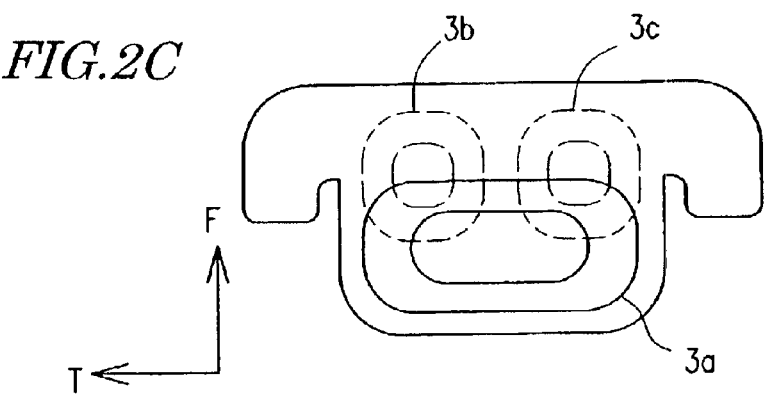

FIG. 2C is a plan view of the coil substrate 3 as viewed from the objective lens 1. As shown in FIG. 2C, the focusing coil 3a is included in the coil substrate 3 so as to overlap with the tracking coils 3b and 3c on the F-T plane and be stacked with the tracking coils 3b and 3c in the direction K. Also, the focusing coil 3a has an elliptical or rectangular shape so as to be longer in the tracking direction T than in the focusing direction F. On the other hand, the tracking coils 3b and 3c have a rectangular shape and their length in the tracking direction T is almost equal to their length in the focusing direction F.

In this preferred embodiment, the focusing coil 3a and the tracking coils 3b and 3c are formed as printed coils inside the first and second layers 3' and 3", respectively. Alternatively, the focusing coil 3a and the tracking coils 3b and 3c may be provided on the surface and back surface of the coil substrate 3, respectively. Furthermore, the focusing coil 3a and the tracking coils 3b and 3c may be independently wound coils and may be either bonded to the surface and the back surface of the coil substrate 3, respectively, or embedded in the coil substrate 3. Also, a third layer may be interposed between the first and second layers 3' and 3". As another alternative, the first layer 3' or the second layer 3", itself may include multiple sub-layers.

As shown in FIG. 1, junction terminal plates 9 are fixed onto the two side surfaces of the lens holder 2 so as to extend vertically to the tracking direction T (i.e., in the direction K). The two terminals of the focusing coil 3a and the two terminals of the tracking coils 3b and 3c in the coil substrate 3 are soldered up with the junction terminal plates 9.

A movable body 41 is made up of the objective lens 1, lens holder 2, coil substrate 3 and junction terminal plates 9. The movable body 41 is symmetrical with respect to a plane that includes the optical axis of the objective lens 1 and that is parallel to the F-K plane. Also, the movable body 41 is designed such that its center of mass is located on the intersection between that plane including the optical axis of the objective lens 1 and the coil substrate 3.

As shown in FIGS. 1 and 2A, the first multipolar magnet 4 includes multiple magnetic pole regions on the same plane. In this preferred embodiment, the first multipolar magnet 4 includes magnetic pole regions 4a and 4b on a first principal surface 4' thereof, which is located more distant from the objective lens 1. The magnetic pole regions 4a and 4b are defined by a magnetic field boundary that is parallel to the T-K plane, and may be magnetized so as to define an S pole and an N pole, respectively. In that case, the two regions on a second principal surface 4' of the first multipolar magnet 4, corresponding to the magnetic pole regions 4a and 4b, may be magnetized so as to define an N pole and an S pole, respectively.

The second multipolar magnet 5 also includes multiple magnetic pole regions on the same plane. In this preferred embodiment, a first principal surface 5' of the second multipolar magnet 5, located closer to the objective lens 1, includes magnetic pole regions 5a and 5b, which are defined by a U-magnetic field boundary extending in the focusing and tracking directions F and T and having a flat bottom. That is, the region 5a is surrounded by the region 5b having a flat-bottomed U shape. The magnetic pole regions Sa and 5b may be magnetized so as to define an N pole and an S pole, respectively. In that case, the two regions on a second principal surface 5″ of the second multipolar magnet 5, corresponding to the magnetic pole regions 5a and 5b, may be magnetized so as to define an S pole and an N pole, respectively.

The first and second multipolar magnets 4 and 5 are secured onto the base 6 so as to sandwich the coil substrate 3 with a gap provided between them and so as to be located closer to, and more distant from, the objective lens 1, respectively.

The two opposed magnetic pole surfaces of the magnetic pole regions 4a and 5a of the first and second multipolar magnets 4 and 5 are the S pole and the N pole, respectively. Thus, two opposite poles of the magnets 4 and 5 face each other. In the same way, the two partially opposed magnetic pole surfaces of the magnetic pole regions 4b and 5b of the first and second multipolar magnets 4 and 5 are the N pole and the S pole, respectively. Thus, two opposite poles of the magnets 4 and 5 also face each other.

Figure 3A:
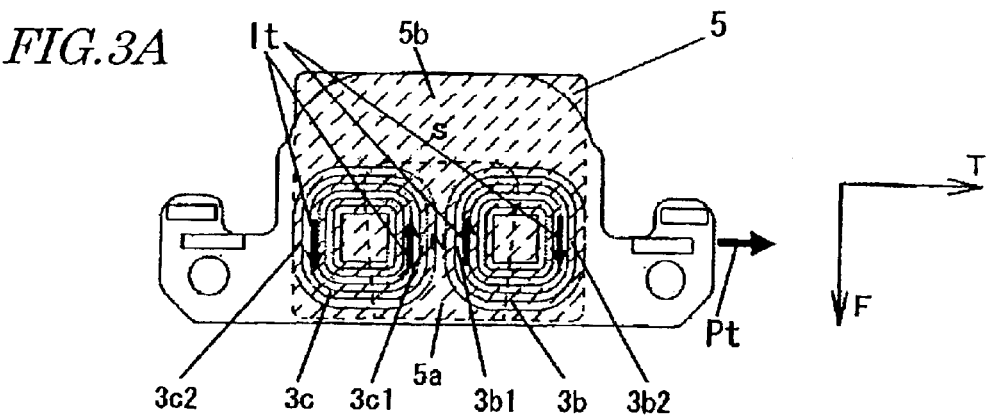
FIG. 3A is a transparent plan view of the coil substrate as viewed in the direction pointed by the arrow U in FIG. 3B to show the positional relationship between the tracking coils and the second multipolar magnet.
Figure 3B:
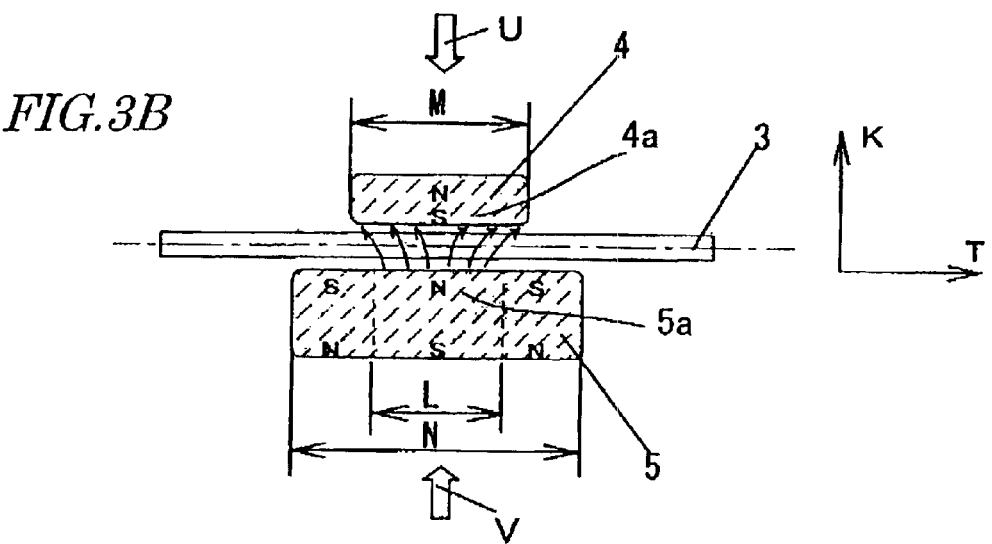
FIG. 3B is a plan view illustrating the coil substrate and the first and second multipolar magnets of the objective lens driver shown in FIG. 1.
Figure 3C:
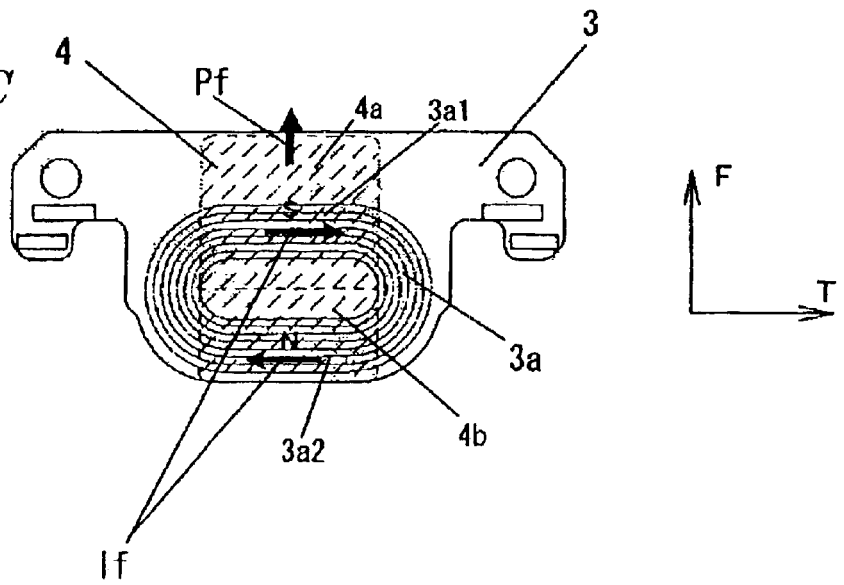
FIG. 3C is a transparent plan view of the coil substrate as viewed in the direction pointed by the arrow V in FIG. 3B to show the positional relationship between the focusing coil and the first multipolar magnet.

FIG. 3B is a plan view illustrating the coil substrate 3 and the first and second multipolar magnets 4 and 5 as viewed from over the objective lens driver. FIG. 3A is a transparent plan view of the coil substrate 3 as viewed in the direction pointed by the arrow U in FIG. 3B to show the positional relationship between the tracking coils 3b and 3c and the second multipolar magnet 5. FIG. 3C is a transparent plan view of the coil substrate 3 as viewed in the direction pointed by the arrow V in FIG. 3B to show the positional relationship between the focusing coil 3a and the first multipolar magnet 4.

As shown in FIG. 3C, the effective coil region 3a1 of the focusing coil 3a, contributing to the focusing drive operation, faces the magnetic pole region 4a of the first multipolar magnet 4, while the effective coil region 3a2 of the focusing coil 3a faces the magnetic pole region 4b of the first multipolar magnet 4.

As shown in FIG. 3A, the effective coil region 3b1 of the tracking coil 3b, contributing to the tracking drive operation, faces the magnetic pole region 5a of the second multipolar magnet 5, while the effective coil region 3b2 of the tracking coil 3b faces the magnetic pole region 5b of the second multipolar magnet 5. In the same way, the effective coil region 3c1 of the tracking coil 3c, contributing to the tracking drive operation, faces the magnetic pole region 5a of the second multipolar magnet 5, while the effective coil region 3c2 of the tracking coil 3c faces the magnetic pole region 5b of the second multipolar magnet 5.

As measured in the tracking direction T, the width M of the first multipolar magnet 4, the width N of the second multipolar magnet 5 and the width L of the magnetic pole region 5a preferably satisfy the inequality of $L<M<N$ as shown in FIG. 3B.

Also, the connecting portions 2a and 2b of the lens holder 2, located between the objective lens 1 and the coil substrate 3, are preferably relatively thick. Then, the driving force transmission path of the movable body 41 can exhibit increased rigidity. When these connecting portions 2a and 2b have an increased thickness in this manner, the width M of the first multipolar magnet 4 as measured in the tracking direction T is preferably defined such that the first multipolar magnet 4 will not contact with the lens holder 2 (i.e., such that a sufficient gap is provided between the first multipolar magnet 4 and the lens holder 2).

As shown in FIG. 1, four wires 7a, 7b, 7c and 7d are soldered up as supporting wires with the two junction terminal plates 9, to which the two terminals of the focusing coil 3a and the terminals of the tracking coils 3b and 3C are connected. The wires 7a through 7d are soldered up with a fixing substrate 10, which is attached to a holder 8 secured to the base 6.

The wires 7a through 7d may be made of an elastic metal material such as beryllium copper or phosphorus bronze, and may have the shape of wires or bars with a circular, substantially polygonal or elliptical cross section. Alternatively, supporting wires with any other shape may also be used. The wires 7a through 7d support the movable body 41 at four points, respectively, and the positional center of four points is defined to substantially match the center of mass of the movable body 41.

Hereinafter, it will be described with reference to FIGS. 3A through 3C how the objective lens driver 51 operates.

First, it will be described how to drive the movable body 41 in the focusing direction F. As shown in FIG. 3C, when a current is supplied to the focusing coil 3a so as to flow in the direction pointed by the arrow If, a driving force is generated in the effective coil regions 3a1 and 3a2 of the focusing coil 3a in the direction pointed by the arrow Pf. This is because the magnetic pole region 4a facing the effective coil region 3a1 is the S pole and the magnetic pole region 4b facing the effective coil region 3a2 is the N pole. As a result, the lens holder 2 is driven in the focusing direction F by the driving force Pf that has been generated in the focusing coil 3a.

Next, it will be described how to drive the movable body 41 in the tracking direction T. As shown in FIG. 3A, when a current is supplied to the tracking coils 3b and 3c so as to flow in the direction pointed by the arrow It, a driving force is generated in the effective coil regions 3b1, 3b2, 3c1 and 3c2 of the tracking coils 3b and 3c in the direction pointed by the arrow Pt. This is because the magnetic pole region 5a facing the effective coil regions 3b1 and 3c1 is the N pole and the magnetic pole region 5b facing the effective coil regions 3b2 and 3c2 is the S pole. As a result, the lens holder 2 is driven in the tracking direction T by the driving force Pt that has been generated in the tracking coils 3b and 3c.

By disposing the second multipolar magnet 5, which is greater in width than the first multipolar magnet 4, more distant from the objective lens 1 as described above, the connecting portions 2a and 2b that connect the coil substrate 3 to the objective lens 1 mechanically can be kept relatively thick. Thus, the capacities of the magnets 4 and 5 can be increased without decreasing the rigidity of the driving force transmission path. As a result, the density of the magnetic flux that links to the coils can be increased and the acceleration sensitivity of the objective lens driver can be improved.

Also, by providing the tracking coils 3b and 3c closer to the second multipolar magnet 5 with the increased width N, three opposite magnetic poles are alternately arranged in the tracking direction T on the portion of the second multipolar magnet 5 that faces the tracking coils 3b and 3c. Thus, the tracking coils 3b and 3a include the effective coil regions 3b1, 3b2, 3c1 and 3c2. That is to say, the effective coil regions of the tracking coils 3b and 3c can be maximized. As a result, the coil effective percentage of the tracking coils 3b and 3c can be increased significantly.

In addition, by providing the focusing coil 3a closer to the first multipolar magnet 4, two opposite magnetic poles are arranged in the focusing direction F on the portion of the first multipolar magnet 4 such that the focusing coil 3a can have the effective coil regions 3a1 and 3a2. That is to say, the effective coil regions of the focusing coil 3a can be maximized. As a result, the coil effective percentage of the focusing coil 3a can be increased significantly.

If the width L of the magnetic pole region 5a of the second multipolar magnet 5 is increased, then the pitch of the tracking coils 3b and 3c in the tracking direction T should be increased. For that reason, to arrange the tracking coils 3b and 3c within the allowed space, the width L should not be increased excessively. On the other hand, the width M of the first multipolar magnet 4 may be greater than the width L as long as the connecting portions 2a and 2b to connect the coil substrate 3 to the objective lens 1 mechanically can be thick enough.

In this case, the magnetic flux, which is directed from the magnetic pole region 5a of the second multipolar magnet 5 toward the magnetic pole region 4a of the first multipolar magnet 4, is included within the width L of the magnetic pole region 5a in the vicinity of the magnetic pole region 5a but has its width broadened to the width M in the vicinity of the magnetic pole region 4a as shown in FIG. 3B.

For that reason, if the width M of the magnetic pole region 4a is set greater than the width L of the magnetic pole region 5a, then the effective length of the effective coil regions 3a1 and 3a2 of the focusing coil 3a can be increased without increasing the pitch of the tracking coils 3b and 3c. As a result, the coil effective percentage of the focusing coil 3a can be increased.

Also, the focusing and tracking coils 3a, 3b and 3c include the six effective coil regions 3a1, 3a2, 3b1, 3b2, 3c1 and 3c2 in total. In addition, four of these six effective coil regions 3a1, 3a2, 3b1 and 3c1 are sandwiched between the magnetic pole regions 4a and 5a of the first and second multipolar magnets 4 and 5. Accordingly, an increased magnetic flux is linked to these effective coil regions, and the acceleration sensitivity can be further improved in the focusing and tracking directions.

In addition, in the coil substrate 3, the plane on which the focusing coil 3a is provided as a flat coil is different from the plane on which the tracking coils 3b and 3c are provided as flat coils. These two planes are defined substantially parallel to each other such that at least a portion of the focusing coil 3a overlaps with the tracking coils 3b and 3c and is stacked with the tracking coils 3b and 3c in the direction K. Thus, the coil substrate 3, in which the focusing coil 3a and the tracking coils 3b and 3c should be included, can have a reduced area. As a result, the overall size of the objective lens driver 51 can also be reduced.

It should be noted that the magnetic field boundary defining the magnetic pole regions 4a and 4b of the first multipolar magnet 4 does not have to be exactly parallel to the T-K plane and that the magnetic field boundary defining the magnetic pole regions 5a and 5b of the second multipolar magnet 5 does not have to be exactly parallel to the tracking and focusing directions T and F, either. The effects of the present invention described above are also achievable as long as the magnetic pole regions 4a, 4b, 5a and 5b face the effective coil regions 3a1, 3a2, 3b1, 3b2, 3c1 and 3c2.

Embodiment 2

Figure 4:
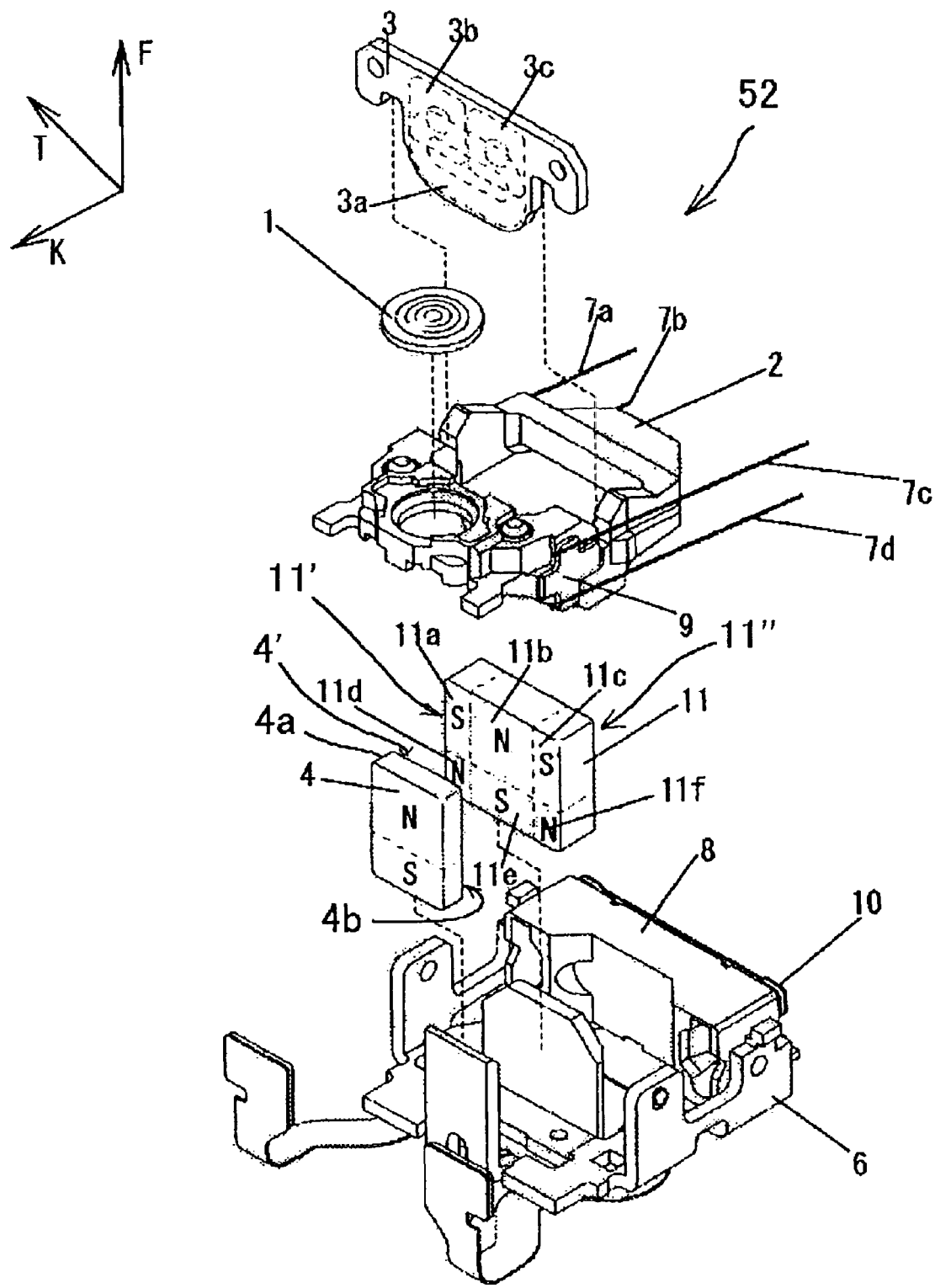
FIG. 4 is an exploded perspective view illustrating an objective lens driver according to a second specific preferred embodiment of the present invention.

FIG. 4 is an exploded perspective view illustrating an objective lens driver 52 according to a second specific preferred embodiment of the present invention. In FIG. 4, each member of the objective lens driver 52, having substantially the same function as the counterpart of the objective lens driver 51 of the first preferred embodiment described above, is identified by the same reference numeral. As shown in FIG. 4, the objective lens driver 52 includes a second multipolar magnet 11 instead of the second multipolar magnet 5 of the first preferred embodiment.

The second multipolar magnet 11 is divided into two rows by a line extending in the tracking direction T and is also divided into three columns by two lines extending in the focusing direction F. Thus, the second multipolar magnet 11 includes six square magnetic pole regions 11a, 11b, 11c, 11d, 11e and 11f.

In the multipolar magnets 4 and 11 of this second preferred embodiment, each pair of adjacent magnetic pole regions has mutually opposite magnetic poles. Specifically, on the first principal surface 11' of the second multipolar magnet 11, the magnetic pole regions 11a, 11c and 11e define the S pole while the magnetic pole regions 11b, 11d and 11f define the N pole. The magnetic pole region 4a on the first principal surface 4' of the first multipolar magnet 4 and the magnetic pole region 11b on the first principal surface 11' of the second multipolar magnet 11 face each other and have mutually opposite magnetic poles. In the same way, the magnetic pole region 4b on the first principal surface 4' of the first multipolar magnet 4 and the magnetic pole region 11e on the first principal surface 11' of the second multipolar magnet 11 face each other and have mutually opposite magnetic poles.

Figure 5A:
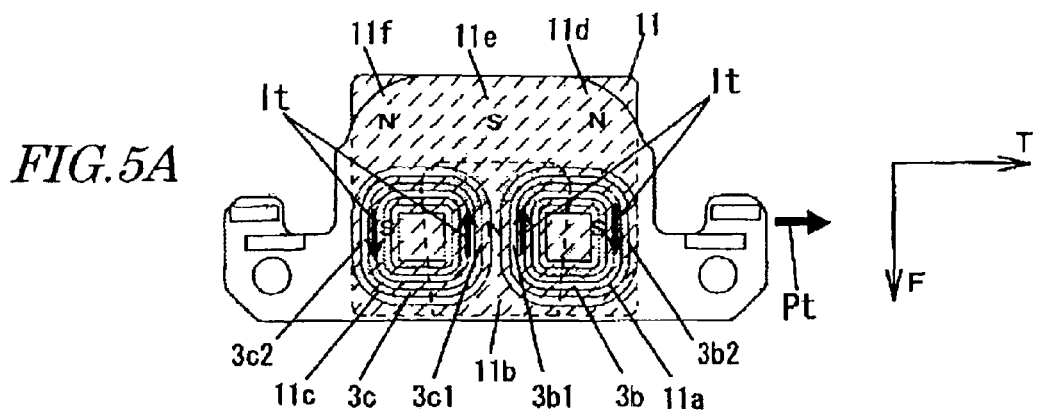
FIG. 5A is a transparent plan view of the coil substrate as viewed in the direction pointed by the arrow U in FIG. 5B to show the positional relationship between the tracking coils and the second multipolar magnet.
Figure 5B:
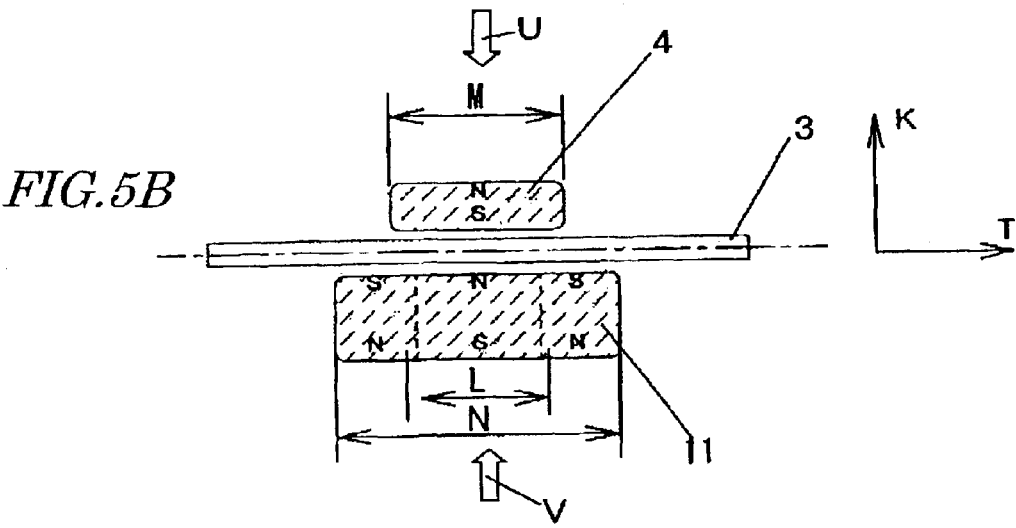
FIG. 5B is a plan view illustrating the coil substrate and the first and second multipolar magnets of the objective lens driver shown in FIG. 4.
Figure 5C:
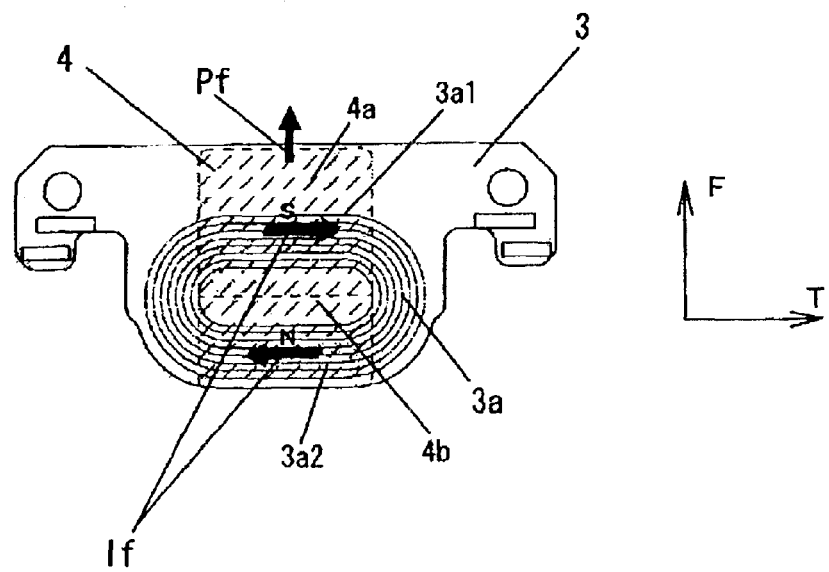
FIG. 5C is a transparent plan view of the coil substrate as viewed in the direction pointed by the arrow V in FIG. 5B to show the positional relationship between the focusing coil and the first multipolar magnet.

FIG. 5B is a plan view illustrating the coil substrate 3 and the first and second multipolar magnets 4 and 11 as viewed from over the objective lens driver 52. FIG. 5A is a transparent plan view of the coil substrate 3 as viewed in the direction pointed by the arrow U in FIG. 5B to show the positional relationship between the tracking coils 3b and 3c and the second multipolar magnet 11. FIG. 5C is a transparent plan view of the coil substrate 3 as viewed in the direction pointed by the arrow V in FIG. 5B to show the positional relationship between the focusing coil 3a and the first multipolar magnet 4.

As shown in FIG. 5A, the effective coil region 3b1 of the tracking coil 3b, contributing to the tracking drive operation, faces the magnetic pole region 11b of the second multipolar magnet 11, while the effective coil region 3b2 of the tracking coil 3b faces the magnetic pole region 11a of the second multipolar magnet 11. In the same way, the effective coil region 3c1 of the tracking coil 3c, contributing to the tracking drive operation, faces the magnetic pole region 11b of the second multipolar magnet 11, while the effective coil region 3c2 of the tracking coil 3c faces the magnetic pole region 11c of the second multipolar magnet 11.

As measured in the tracking direction T, the width M of the first multipolar magnet 4, the width N of the second multipolar magnet 11 and the width L of the magnetic pole region 11b at the center column preferably satisfy the inequality of L<M<N as in the first preferred embodiment described above.

On the first principal surface 11' of the second multipolar magnet 11, the ratio of the total area of the N-pole regions to that of the S-pole regions is defined as the ratio of the total area of the magnetic pole regions 11b, 11d and 11f to that of the magnetic pole regions 11a, 11b and 11e. In this preferred embodiment, the ratio is preferably approximately one to one. Thus, the distribution of the N and S poles is not biased, and the peaks of the magnetic field strength distribution as measured in the focusing direction F do not change so significantly in the tracking direction. Accordingly, the center of the driving force applied to the movable body 41 in the tracking direction T can be easily matched to the center of the supporting force applied to the movable body 41. As a result, the movable body 41 can be moved in the tracking direction T without allowing the objective lens 1 to tilt.

Also, since the ratio of the total area of the N-pole regions to that of the S-pole regions is substantially one to one, the magnets can be magnetized highly uniformly, and the magnetic field strength and the magnetization pattern can be stabilized sufficiently. Thus, an objective lens driver 52 exhibiting stabilized performance can be obtained with the variation among the respective products minimized.

Embodiment 3

Figure 6:
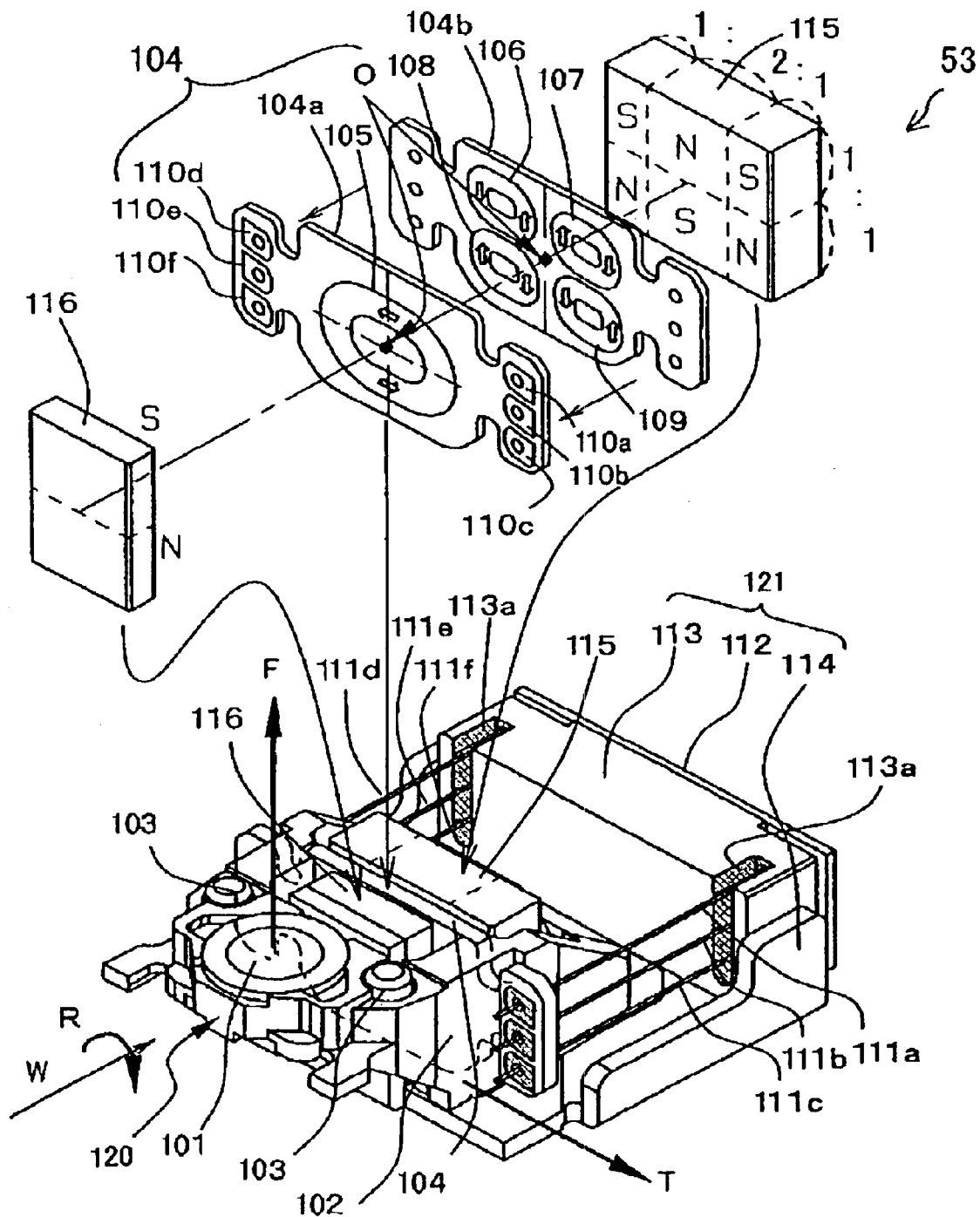
FIG. 6 is an exploded perspective view illustrating an objective lens driver according to a third specific preferred embodiment of the present invention.

FIG. 6 is an exploded perspective view illustrating an objective lens driver 53 according to a third specific preferred embodiment of the present invention. To reduce the aberration of a beam spot to be formed on the data side of a disc, the objective lens driver 53 of this third preferred embodiment also corrects the radial tilt of the objective lens as measured around an axis that is defined in the circumferential direction of the disc. In FIG. 6, the arrow F denotes the focusing direction, the arrow T denotes the tracking direction and the arrow R denotes the radial tilt direction. Also, the direction that is defined to be perpendicular to the focusing and tracking directions F and T is pointed by the arrow W. As in the first preferred embodiment described above, a plane defined by the focusing and tracking directions F and T will be referred to herein as an F-T plane.

As shown in FIG. 6, the objective lens driver 53 includes an objective lens 101, a lens holder 102, a coil substrate 104, a first multipolar magnet 116 and a second multipolar magnet 115.

The objective lens 101 and the coil substrate 104 are secured (e.g., bonded) to the lens holder 102, thereby making up a movable body 120. Lens protectors 203 are provided for the movable body 120 to prevent the objective lens 101 from contacting the disc (not shown) unintentionally.

The coil substrate 104 has a multilayer structure consisting of a first layer 104a and a second layer 104b that are stacked one upon the other. The first layer 104a includes a focusing coil 105 only, while the second layer 104b includes tracking coils 106, 107, 108 and 109 only. As in a conventional objective lens driver, the first and second layers 104a and 104b may include a thin substrate of glass epoxy, for example, and coil(s) obtained by etching a copper foil into a vortex shape. The first and second layers 104a and 104b are stacked one upon the other and the assembly is further covered with protective coatings, thereby making up the coil substrate 104. On the surface of the first layer 104a, lands 110a, 110b, 110c, 110d, 110e and 110f are provided as coil terminals.

The focusing coil 105 may be provided either on one of the two principal surfaces of the first layer 104a or in the first layer 104a. Also, the tracking coils 106, 107, 108 and 109 may be provided either on one of the two principal surfaces of the second layer 104b or in the second layer 104b.

Furthermore, the focusing coil 105 and the tracking coils 106, 107, 108 and 109 may be independently wound coils, which may be bonded onto the surface and back surface of the coil substrate 104 or embedded in the coil substrate 104. Also, a third layer may be interposed between the first and second layers 104a and 104b. As another alternative, the first layer 104a or the second layer 104b itself may include multiple sub-layers.

In the conventional objective lens driver, when the focusing and tracking coils are provided as printed coils, the focusing and tracking coils are provided on the same plane. In contrast, in the coil substrate 104 of this preferred embodiment, the plane on which the flat focusing coil 105 expands is different from the plane on which the flat tracking coils 106 through 109 expand, and these two planes are defined substantially parallel to each other such that at least a portion of the focusing coil 105 overlaps with the tracking coils 106 through 109 and is stacked with the tracking coils 106 through 109 in the direction perpendicular to the focusing direction and the tracking direction. The connection and arrangement of the respective coils will be described in detail later.

As shown in FIG. 6, the objective lens driver 53 further includes suspension wires 111a, 111b, 111c, 111d, 111e and 111f, a fixing substrate 112, a wire holder 113 and a yoke base 114.

The suspension wires 111a through 111f are respectively bonded (e.g., soldered up) to the lands 110a through 110f of the coil substrate 104 at one end thereof. The other end of the suspension wires 111a through 111f may also be bonded (e.g., soldered up) to the fixing substrate 112. The fixing substrate 112, wire holder 113 and yoke base 114 may be secured together with an adhesive or screws, for example, thereby making up a fixing portion 121. The first and second multipolar magnets 116 and 115 are bonded onto the yoke base 114 so as to sandwich the coil substrate 104 of the movable body 120 with a predetermined gap provided between them. The method of magnetizing the first and second multipolar magnets 116 and 115 will be described later in connection with the coil patterns.

The suspension wires 111a through 111f are arranged so as to be substantially parallel to each other. The movable body 120 is supported by the suspension wires 111a through 111f so as to translate in the focusing direction F and in the tracking direction T and rotate in the radial tilt direction R with respect to the fixing portion 121. The rotational axis in the radial tilt direction R is perpendicular to the focusing direction F and the tracking direction T. The suspension wires 111a through 111f may be made of a conductor such as a beryllium-copper alloy or phosphorus bronze, and function as not only elastic supporting members for the movable body 120 but also current paths for the coil substrate 104. The wire holder 113 includes notches 113a, to which a damping material such as a gel is injected. Due to its viscosity, the damping material can attenuate the vibration of the movable body 120 that has been transmitted through the suspension wires 111a through 111f.

Next, it will be described how to magnetize the first and second multipolar magnets 116 and 115. As shown in FIG. 6, the first multipolar magnet 116 is located closer to the focusing coil 105 than to the tracking coils 106 through 109, while the second multipolar magnet 115 is located closer to the tracking coils 106 through 109 than to the focusing 105.

The second multipolar magnet 115 is divided into three columns by two planes that are defined to be perpendicular to the tracking direction T and to be parallel to the focusing direction F. As measured in the tracking direction T, those three columns have widths that substantially satisfy a ratio of one to two to one. Furthermore, the second multipolar magnet 115 is also divided into two lines by a plane that is defined to be perpendicular to the focusing direction F and parallelly to the tracking direction T. As measured in the focusing direction F, those two lines have widths that substantially satisfy a ratio of one to one. A magnetic flux is produced from the second multipolar magnet 115 perpendicularly to the coil substrate 104 (i.e., in the direction pointed by the arrow W). Each pair of adjacent divided regions are magnetized alternately (i.e., an N-pole region alternates with an S-pole region). The polarities of the respective divided regions may be defined as shown in FIG. 6, for example.

As measured in the focusing direction F, the first multipolar magnet 116 is almost as tall as the second multipolar magnet 115. Also, as measured in the tracking direction T, the width of the first multipolar magnet 116 is approximately equal to that of the central magnetized regions of the second multipolar magnet 115. Furthermore, the first multipolar magnet 116 is divided into two portions by a plane that is defined to be perpendicular to the focusing direction F and parallelly to the tracking direction T. Those two portions have widths that substantially satisfy a ratio of one to one as measured in the focusing direction F. The polarities of the two divided magnetized regions of the first multipolar magnet 116 are determined so as to be opposite to those of their associated magnetized regions of the second multipolar magnet 115. More specifically, the first and second multipolar magnets 116 and 115 are magnetized such that an S-pole region of the first multipolar magnet 116 faces an N-pole region of the second multipolar magnet 115. The first and second multipolar magnets 116 and 115 and the coil substrate 104, which is disposed in the gap between the first and second multipolar magnets 116 and 115, together constitute a magnetic circuit that passes a huge number of magnetic lines of flux.

In this preferred embodiment, the first and second multipolar magnets 116 and 115 are multipolar magnetized by dividing each of these magnets 116 and 115 into multiple portions having respective widths as described above. This technique is adopted to minimize the decrease in driving sensitivity, which normally results from the size reduction of an objective lens driver. More specifically, the first and second multipolar magnets 116 and 115 are each divided into two portions having an equal width in the focusing direction F because a strict size limitation must be overcome in the focusing direction F in an optical disc drive with a reduced thickness for use in a notebook computer, for example. Generally speaking, if just a small area of a magnet is multipolar magnetized, no parallel magnetic field can be produced and the maximum magnetic flux density decreases. For that reason, the smaller the number of divided magnetized regions and the greater the width of the magnetized regions, the more preferable. Thus, in this preferred embodiment, the first and second multipolar magnets 116 and 115 are each divided into two portions having an approximately equal width in the focusing direction F, thereby minimizing the decrease in magnetic flux density.

The second multipolar magnet 115 is divided into three portions having respective widths that substantially satisfy the ratio of one to two to one in the tracking direction T. This technique is adopted to supply the magnetic flux to all of the effective coil regions of the tracking coils 106 through 109 as will be described later. The central magnetized regions have the width that is approximately twice as large as that of the peripheral magnetized regions. Then, a greater percentage of the magnetic flux can contribute to the tracking and focusing coils and the driving sensitivity can be maximized both in the tracking direction and in the focusing direction.

In the second multipolar magnet 115, if the width of the central magnetized regions is increased with respect to that of the peripheral magnetized regions, then the percentage of increase in the magnetic flux supplied by the central magnetized regions would be short of the percentage of decrease in the magnetic flux supplied by the peripheral magnetized regions. In that case, a sufficient magnetic flux for driving the objective lens in the tracking direction T cannot be obtained anymore and the driving efficiency in the tracking direction decreases. On the other hand, if the width of the central magnetized regions of the second multipolar magnet 115 is decreased with respect to that of the peripheral magnetized regions, then a sufficient magnetic flux cannot be supplied from the central magnetized regions and the driving efficiency in the focusing direction decreases. For these reasons, the second multipolar magnet 115 is most preferably divided into three portions having respective widths that substantially satisfy the ratio of one to two to one in the tracking direction as described above. However, the best division ratio is slightly changeable with the arrangement of the coil patterns and the size limitations on the magnets. Thus, the best division ratio is not always exactly equal to one to two to one.

In an optical disc drive with a reduced thickness, a severe size limitation is also imposed on members surrounding the objective lens 1. Thus, to overcome such a limitation, the first multipolar magnet 116, having the smaller width in the tracking direction T, is provided closer to the objective lens 1, while the second multipolar magnet 115 is provided more distant from the objective lens 1. In that case, the connecting portions of the lens holder 102 between the objective lens 101 and the coil substrate 104 can have an increased thickness, and the lens holder 102 can have increased rigidity, as already described for the first and second preferred embodiments. Also, since the second multipolar magnet 115 mainly supplies a magnetic flux for use to drive the objective lens in the tracking direction T, it is advantageous to provide the second multipolar magnet 115 closer to the tracking coils 106 through 109.

Figure 7:
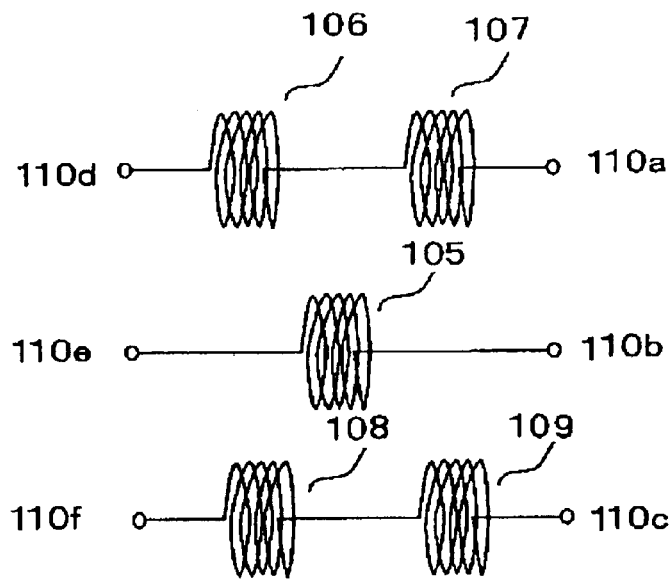
FIG. 7 is a wiring diagram illustrating coil patterns for the objective lens driver shown in FIG. 6.

FIG. 7 is a wiring diagram showing how the focusing coil 105 and tracking coils 106 through 109 may be connected together in the coil substrate 104. In FIG. 7, the open circles represent the connector terminals of the coils and respectively correspond to the lands 110*a* through 10*f* shown in FIG. 6. As shown in FIG. 6, the center of the rectangle that is defined by the lands 110*a*, 110*c*, 110*d* and 110*f* matches the rotational center O of the movable body 120. That is, the rotational center O is also a positional center of six points at which the suspension wires 111*a* through 111*f*.support the movable body 120. It should be noted that although two rotational centers O are shown in FIG. 6, these rotational centers O actually represent a single rotational center O because the first and second layers 104*a* and 104*b* are bonded together. Also, the rotational centers O is a point at which the rotational axis of the movable body 120 in the radial tilt direction intersects the coil substrate 104.

The focusing coil 105 is provided in the coil substrate 104 so as to be symmetric substantially about the rotational center O. Also, the focusing coil 105 has its winding axis defined to be parallel to the arrow W, has an elongated shape in the tracking direction T and has a flat shape on an F-T plane. The focusing coil 105 is connected such that when a predetermined voltage is applied between the lands 110*b* and 110*e*, a current flows therethrough in the direction pointed by the arrows on the coil substrate 104 shown in FIG. 6. A focusing driving portion for driving the objective lens in the focusing direction F is formed by the interaction between the current flowing through the focusing coil 105 and the magnetic flux that has been generated in the gap between the first and second multipolar magnets 116 and 115 (i.e., by an electromagnetic force according to the Fleming law).

The tracking coils 106 through 109 have their winding axis defined in the same direction as the focusing coil 105 and also have a flat shape on an F-T plane. As shown in FIG. 6, these tracking coils 106 through 109 are disposed symmetrically with respect to an axis that is defined in the focusing direction F so as to pass the rotational center O and to an axis that is defined in the tracking direction T. In these four tracking coils 106 through 109, an upper pair of coils is made up of the tracking coils 106 and 107 and a lower pair of coils is made up of the tracking coils 108 and 109.

More specifically, the tracking coils 106 and 107 are connected in series together as shown in FIG. 7 such that when a predetermined voltage is applied between the lands 110a and 110d, current flows through the tracking coils 106 and 107 in the directions pointed by the arrows on the coil substrate 104 shown in FIG. 6. In the same way, the tracking coils 108 and 109 are also connected in series together as shown in FIG. 7 such that when a predetermined voltage is applied between the lands 110c and 110f, current flows through the tracking coils 108 and 109 in the directions pointed by the arrows on the coil substrate 104 shown in FIG. 6.

Current can flow through the upper pair of coils 106 and 107 by way of the suspension wires 111a and 111d, while current can flow through the lower pair of coils 108 and 109 by way of the suspension wires 111c and 111f. As in the focusing driving portion, a tracking driving portion and a radial tilt driving portion are formed by the interaction between the currents supplied through the upper and lower pairs of coils and the magnetic flux that has been generated in the gap between the first and second multipolar magnets 116 and 115.

Figure 8:
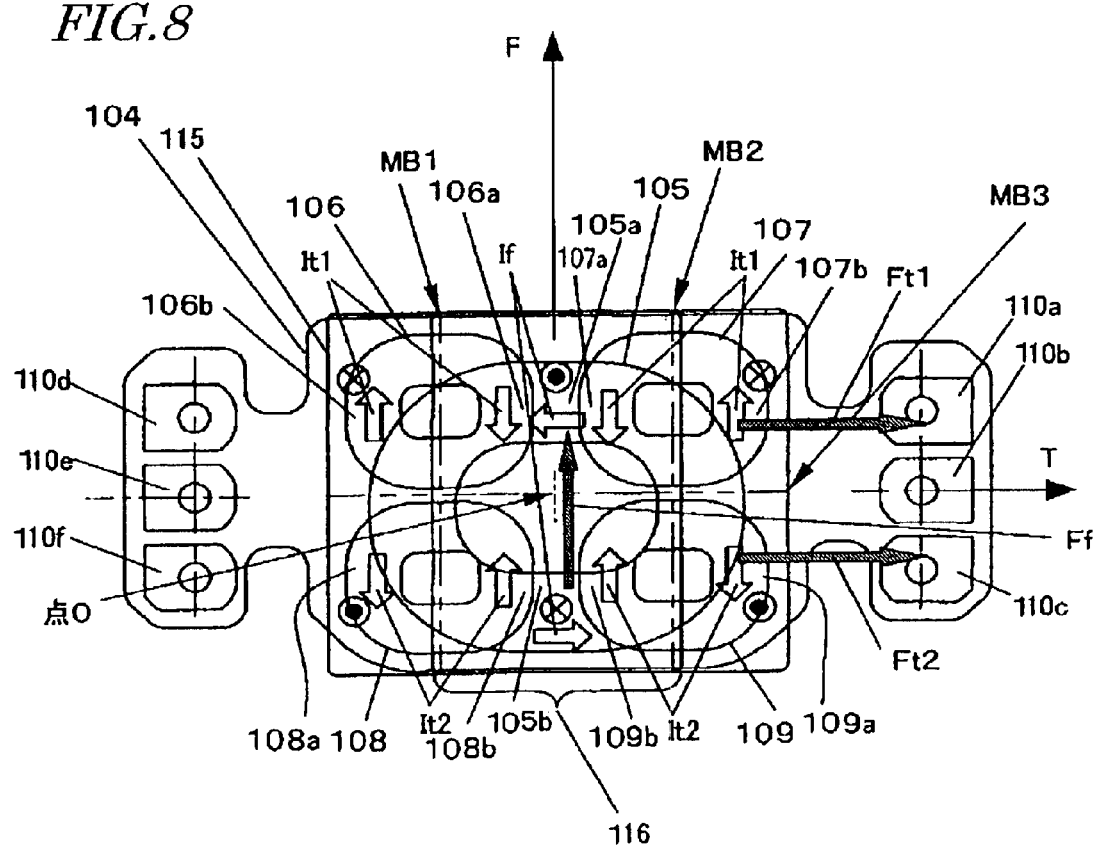
FIG. 8 is a transparent plan view showing the arrangement of the coil patterns and the magnetic pole regions in the objective lens driver shown in FIG. 6.

Next, it will be described how the objective lens driver 53 operates. FIG. 8 is a transparent plan view illustrating the arrangement of the coil patterns and the magnetic poles in the objective lens driver 53 of this third preferred embodiment. In FIG. 8, the first multipolar magnet 116, coil substrate 104 and second multipolar magnet 115 are viewed perpendicularly to the coil substrate 104 (i.e., in the direction pointed by the arrow W in FIG. 6).

In FIG. 8, the arrows F and T and the point O also indicate the focusing direction F, tracking direction T and rotational center O of the movable body 120 as in FIG. 6. The two-dot chains MB1 and MB2 indicate the magnetic field boundaries that are defined in the tracking direction T for the second multipolar magnet 115. And the other two-dot chain MB3 indicates the magnetic field boundary that is defined in the focusing direction F for the first and second multipolar magnets 116 and 115.

In the following description, the focusing coil 105 is supposed to be divided in the focusing direction F by the magnetic field boundary MB3 into two regions 105a and 105b for the sake of simplicity. First, when a predetermined voltage is applied between the lands 110b and 110e, a focusing drive current If flows through the focusing coil 105. The magnetic flux, generated in the gap between the first and second multipolar magnets 116 and 115, comes out of the paper (i.e., faces the direction opposite to that pointed by the arrow W in FIG. 6) in a region 107a that is located over the magnetic field boundary MB3 but goes deeper into the paper (i.e., faces the direction pointed by the arrow W in FIG. 6) in a region 107b that is located under the magnetic field boundary MB3. Accordingly, when the Fleming law is applied with special care taken of the directions of the current and magnetic flux, an electromagnetic force Ff is applied in the same direction in the regions 107a and 107b, thereby driving the coil substrate 104 in the focusing direction F. As a result, the movable body 120, in which the coil substrate 104 is combined with the objective lens 1 by way of the lens holder 102, translates in the focusing direction F. If the direction of the current If is reversed, a reversed electromagnetic force Ff is obtained. The objective lens driver 53 performs the focusing operation in this manner.

Next, the operations of the tracking coils 106 through 109, which are arranged axisymmetrically about the rotational center O, will be described for the respective regions to be defined by the magnetic field boundaries MB1 and MB2. Specifically, the tracking coil 106 is divided by the magnetic field boundary MB1 into two regions 106a and 106b. Each of the other three tracking coils 107, 108 and 109 is also divided into two regions 107a & 107b, 108a & 108b and 109a & 109b. As shown in FIG. 8, the magnetic flux comes out of the paper (i.e., faces the direction opposite to that pointed by the arrow W in FIG. 6) in the regions 106a, 107a, 108a and 109a, while the magnetic flux goes deeper into the paper (i.e., faces the direction pointed by the arrow W in FIG. 6) in the other regions 106b, 107b, 108b and 109b.

When a predetermined voltage is applied between the lands 110a and 110d, a current It1 flows through the tracking coils 106 and 107, which are connected in series together as the upper pair of coils. If the Fleming law is applied to the upper pair of coils as in the focusing coil 105, an electromagnetic force Ft1 is applied to the tracking coils 106 and 107 in the tracking direction T.

In the same way as the upper pair of coils, when a predetermined voltage is applied between the lands 110c and 110f, a current It2 flows through the tracking coils 108 and 109, which are connected in series together as the lower pair of coils. As a result, an electromagnetic force Ft2 is applied to the tracking coils 108 and 109 in the tracking direction T. Thus, the resultant of the electromagnetic forces Ft1 and Ft2 drives the objective lens 1 (or allows the movable body 120 to translate) in the tracking direction T. If the currents It1 and It2 have the same phase but opposite directions, then forces are applied in mutually opposite directions to the upper and lower pairs of coils. The objective lens driver 53 performs the tracking operation in this manner.

Figure 9:
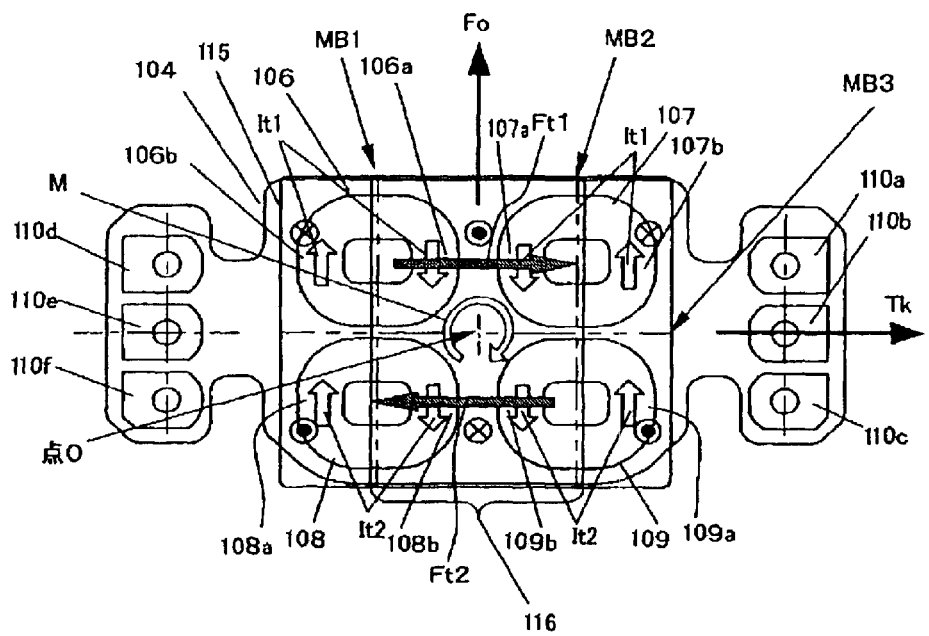
FIG. 9 is a transparent plan view showing the relationship between the directions of currents flowing through the objective lens driver shown in FIG. 6 during a radial tilt operation thereof and those of a magnetic flux.

Next, it will be described how the objective lens driver 53 performs the radial tilt operation. FIG. 9 shows the relationship between the directions of currents and the magnetic poles while the objective lens driver 53 is performing the radial tilt operation. The illustration of the focusing coil 105 is omitted from FIG. 9. In performing the radial tilt operation, the directions of currents flowing through the lower pair of coils (i.e., the tracking coils 108 and 109) are reversed to the tracking operation shown in FIG. 8 and the phase of the currents flowing through the lower pair of coils is opposed to that of the currents flowing through the upper pair of coils.

The currents It1 flowing through the upper pair of tracking coils 106 and 107 during the radial tilt operation are the same as the currents It1 flowing there during the tracking operation shown in FIG. 8. Thus, as in the tracking operation shown in FIG. 8, the electromagnetic force Ft1 is also applied to the upper pair of coils 106 and 107 in the tracking direction T during this radial tilt operation. On the other hand, the currents It2 flowing through the lower pair of tracking coils 108 and 109 during the radial tilt operation are opposite to the currents It2 flowing there during the tracking operation shown in FIG. 8. Accordingly, during this radial tilt operation, the electromagnetic force Ft2 is applied to the lower pair of coils 108 and 109 in the direction that is opposite to the tracking direction T. Consequently, the resultant of the electromagnetic forces Ft1 and Ft2 produces a moment around the rotational center O in the direction pointed by the arrow M in FIG. 9. Alternatively, if the tracking drive currents It1 and It2 are allowed to flow in mutually opposite phases and in mutually opposite directions, then the moment will be produced in the direction opposite to that pointed by the arrow M in FIG. 9. As described above, if the currents flowing through the upper pair of coils and the currents flowing through the lower pair of coils have mutually opposite phases, then the objective lens 101 can be driven rotationally in the radial tilt direction. The objective lens driver 53 performs the radial tilt operation in this manner.

In summary, if the currents supplied to the upper pair of tracking coils have the same phase as the currents supplied to the lower pair of tracking coils, the movable body 120 is allowed to translate in the tracking direction T. On the other hand, if the phase of the currents supplied to the upper pair of tracking coils is opposite to that of the currents supplied to the lower pair of tracking coils, the movable body 120 is allowed to rotate in the radial tilt direction R.

Hereinafter, it will be described why the objective lens driver 53 generates a small degree of static radial tilt in spite of its reduced size when driving the movable body 120 in the focusing direction or in the tracking direction.

First, the flux density distributions to be formed by the first and second multipolar magnets 116 and 115 will be described. Thereafter, it will be described how the objective lens driver 53 reduces the degree of static radial tilt by making the moment produced by the focusing drive current only and the moment produced by the tracking drive currents only cancel each other.

Figure 10A:
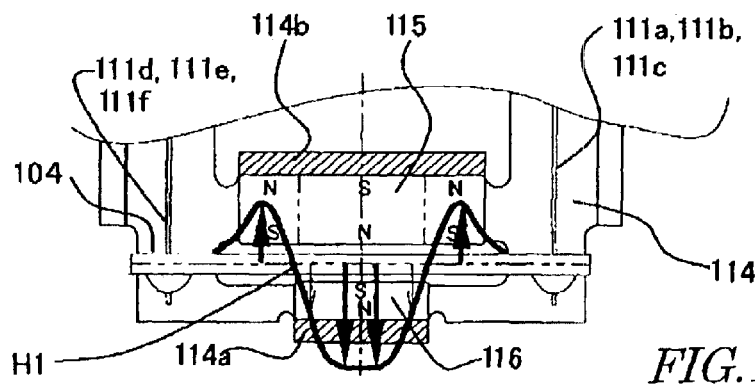
FIGS. 10A and 10C are cross-sectional views thereof as taken on the planes Xa—Xa and Xc—Xc shown in FIG. 10B.
Figure 10B:
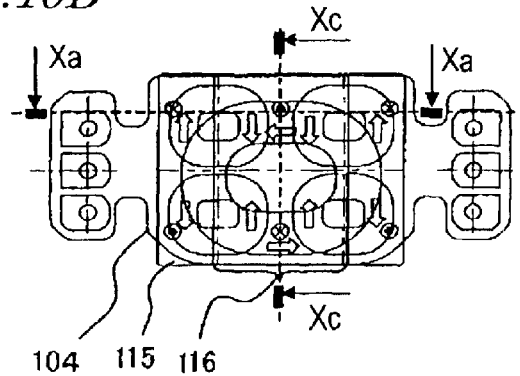
FIG. 10B is a plan view illustrating the coil substrate of the objective lens driver shown in FIG. 6.
Figure 10C:
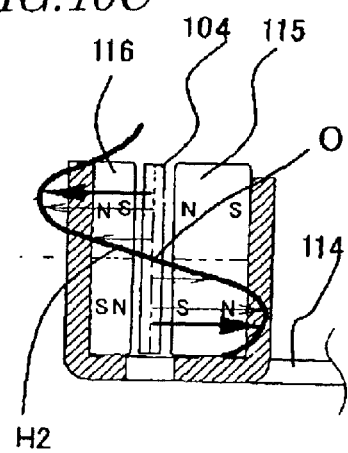

FIG. 10B is a transparent plan view of the first multipolar magnet 116, coil substrate 104 and second multipolar magnet 115 as viewed perpendicularly to the coil substrate 104 (i.e., in the direction pointed by the arrow W in FIG. 6). FIGS. 10A and 10C are cross-sectional views of the objective lens driver 53 as taken on the planes Xa—Xa and Xc—Xc shown in FIG. 10B.

FIGS. 10A, 10B and 10C show the coil substrate 104, yoke base 114, first and second multipolar magnets 116 and 115, and suspension wires 111a through 111f. As shown in FIG. 10A, the yoke base 114 includes back yoke portions 114a and 114b, which are obtained by bending portions thereof, and form integral parts of the magnetic circuit to be defined by the first and second multipolar magnets 116 and 115. Also, the polarities of the magnetic pole regions on the principal surfaces of the first and second multipolar magnets 116 and 115 are indicated by N and S.

In FIGS. 10A and 10C, the bold curves H1 and H2 indicate the strength of the magnetic field that penetrates the coil substrate 104. As shown in FIGS. 10A and 10C, the magnetic field distributions are not uniform on the cross sections that are taken on the planes Xa—Xa and Xc—Xc, respectively. As indicated by the bold curve H1, the magnetic flux supplied from the central magnetized regions of the first and second multipolar magnets 116 and 115 is approximately twice as strong as the magnetic flux supplied from the peripheral magnetized regions thereof.

However, as is clear from FIG. 10A, the magnetic field strength is distributed symmetrically about the plane Xc—Xc. Also, as can be seen from FIG. 10C, the magnetic field strength is also distributed symmetrically about the point O on the plane Xc—Xc. Accordingly, if the movable body 120 is driven only in the focusing direction F and not driven in the tracking direction T at all, almost no static radial tilt is generated due to the symmetry of the magnetic field and the symmetry of the focusing coil. Also, even if the movable body 120 is driven only in the tracking direction T and not driven in the focusing direction F at all, almost no static radial tilt is generated, either, due to the symmetry of the magnetic field and the symmetry of the tracking coils.

Figure 11A:
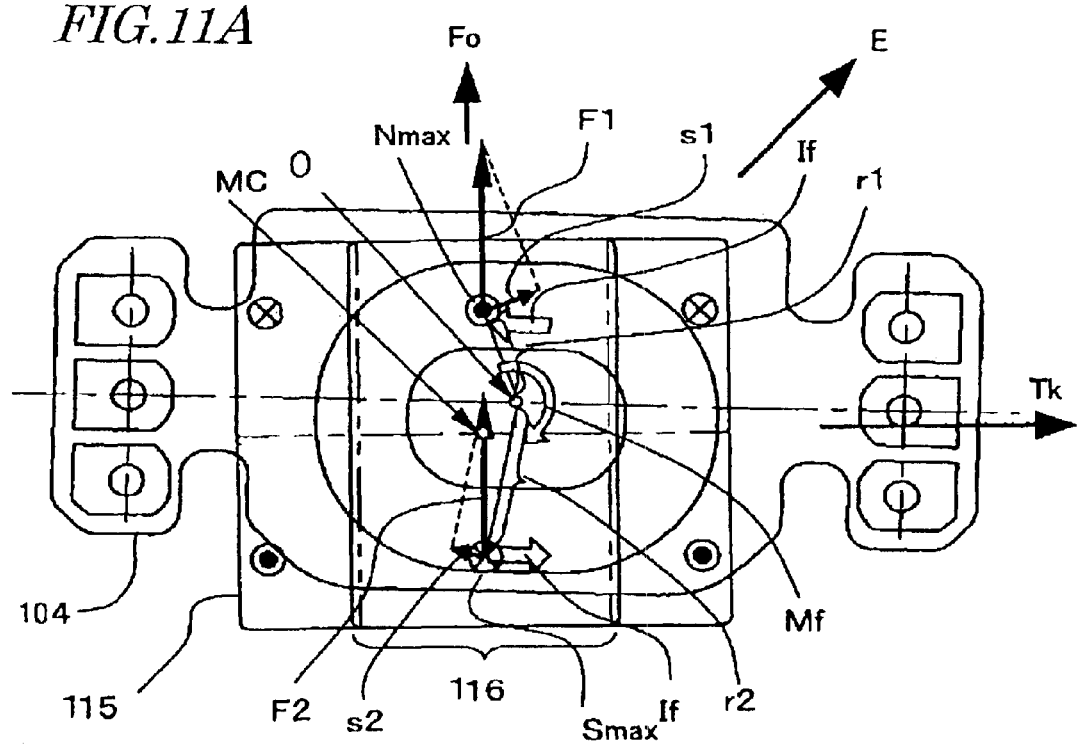
FIG. 11A is a plan view schematically showing a moment to be produced by a drive current that drives the movable body in the focusing direction in the objective lens driver shown in FIG. 6.
Figure 11B:
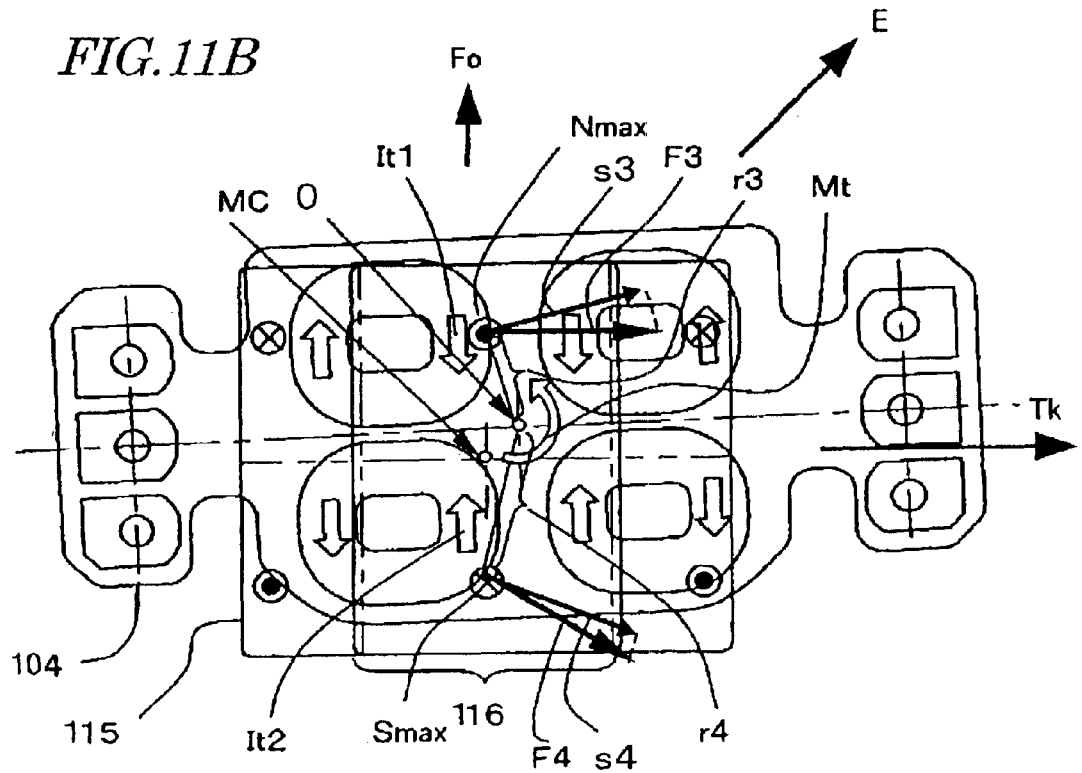
FIG. 11B is a plan view schematically showing a moment to be produced by drive currents that drive the movable body in the tracking direction in the objective lens driver shown in FIG. 6.

Next, it will be described with reference to FIGS. 11A and 11B how the objective lens driver 53 reduces the static radial tilt while driving the movable body 120 in the focusing and tracking directions simultaneously. FIG. 11A schematically illustrates a moment to be produced by the drive current that is supplied to drive the movable body 120 in the focusing direction F. FIG. 11B schematically illustrates a moment to be produced by the drive current that is supplied to drive the movable body 120 in the tracking direction T.

FIGS. 11A and 11B are transparent plan views of the first multipolar magnet 116, coil substrate 104 and second multipolar magnet 115 as viewed perpendicularly to the coil substrate 104 (i.e., in the direction pointed by the arrow W in FIG. 6). The directions and reference numerals of the magnetic poles and the currents flowing through the respective coils are the same as those shown in FIG. 8. As shown in FIGS. 11A and 11B, the coil substrate 104 moves in the focusing and tracking directions F and T and the rotational center O moves from the center MC of the magnets in the direction pointed by the arrow E by reference to the first and second multipolar magnets 116 and 115.

FIG. 11A definitely shows the location of the focusing coil 105 and the electromagnetic force to be generated by the current flowing through the focusing coil 105. On the other hand, FIG. 11B clearly shows the locations of the tracking coils 106, 107, 108 and 109 and the electromagnetic force to be generated by the currents flowing through the tracking coils 106 through 109. In FIGS. 11A and 11B, the points having the maximum magnetic field strength are indicated by the points Nmax and Smax. Hereinafter, this operation will be outlined by reference to the forces that are produced at these points Nmax and Smax.

At the points Nmax and Smax shown in FIG. 11A, forces F1 and F2 to be determined by the direction of the current If flowing through the focusing coil 105 and the directions of the magnetic flux act on the focusing coil 105. The moment Mf to be produced by the current If around the rotational center O is the sum of the product of the rotational component s1 and the radius r1 of the force F1 and the product of the rotational component s2 and the radius r2 of the force F2. That is to say, Mf=s1×r1+s2×r2. As is clear from FIG. 11A, the moment Mf acts dextrorotatorily (i.e., in the direction pointed by the arrow R in FIG. 6).

At the point Nmax shown in FIG. 11B, a force F3 to be determined by the directions of the current It1 flowing through the tracking coils 106 and 107 and the direction of the magnetic flux acts on the tracking coils 106 and 107. On the other hand, at the point Smax shown in FIG. 11B, a force F4 to be determined by the directions of the current It2 flowing through the tracking coils 108 and 109 and the direction of the magnetic flux acts on the tracking coils 108 and 109. The moment Mt to be produced by the currents It1 and It2 around the rotational center O is the sum of the product of the rotational component s3 and the radius r3 of the force F3 and the product of the rotational component s4 and the radius r4 of the force F4. That is to say, Mt=−s3×r3+s4×r4. Comparing the magnitude of the moment s3×r3 to that of the moment s4×r4, it can be seen that the moment Mt acts levorotatorily (i.e., in the direction opposite to that pointed by the arrow R in FIG. 6) as shown in FIG. 11B. This is because the magnitude of the rotational component s3 is approximately equal to that of the rotational component s4 and the radius r4 is longer than the radius r3 as can be seen from FIG. 11B.

In this manner, the moment Mf to be produced by the drive current If so as to drive the movable body 120 in the focusing direction F and the moment Mt to be produced by the drive currents It1 and It2 so as to drive the movable body 120 in the tracking direction T act in mutually opposite directions. That is to say, the moment to be produced by the focusing drive current only and the moment to be produced by the tracking drive currents only cancel each other, thus reducing the degree of static radial tilt. Accordingly, even if the movable body 120 is driven both in the focusing and tracking directions by this objective lens driver 53, just a small degree of static radial tilt is generated.

It should be noted that the operation of the objective lens driver 53 has been described with reference to FIGS. 11A and 11B by a rough approximation based on large components representing magnetic field strengths. However, it will be even clearer how the static radial tilt is reduced advantageously if the electromagnetic forces to be generated by the currents flowing through the coil patterns and the magnetic field strengths are calculated on respective finely divided sections and if the moments produced around the rotational center O are calculated by integration. Hereinafter, those effects will be described with reference to FIGS. 12A, 12B and 12C.

Figure 12A:
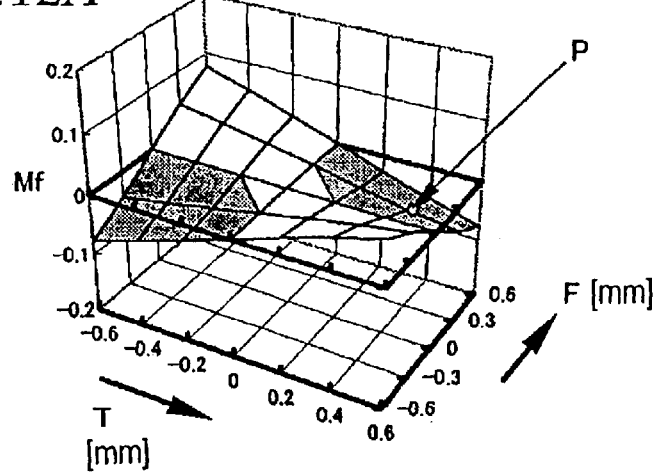
FIGS. 12A, 12B and 12C are graphs showing moments to be estimatingly produced by the drive currents flowing through the objective lens driver shown in FIG. 6.
Figure 12B:
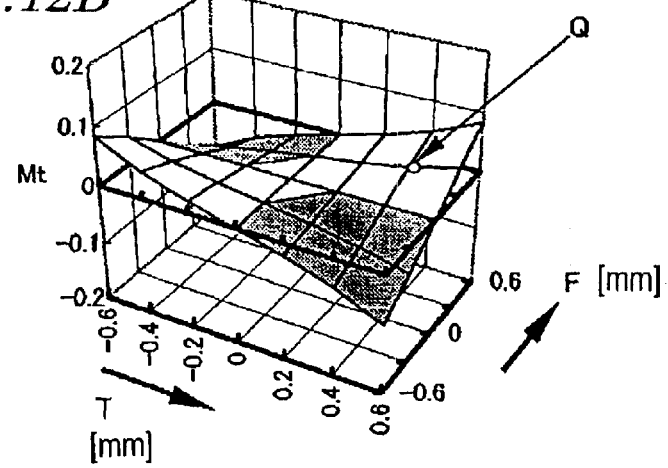
Figure 12C:
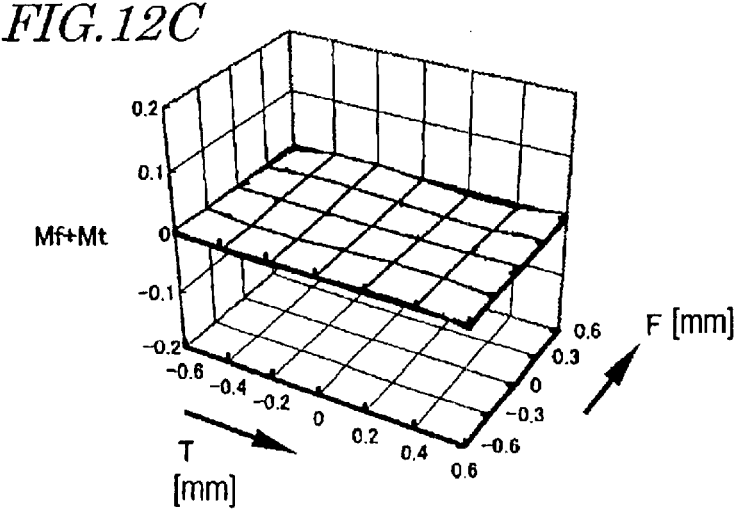

FIGS. 12A, 12B and 12C are graphs showing moments to be estimatingly produced around the rotational center O by the drive currents flowing through the objective lens driver 53. The moments shown on these three-dimensional graphs were obtained by using the spring constant of the suspension wires, the magnetic field distribution, and drive currents as respective parameters and setting those parameters to appropriate values. In each of the graphs shown in FIGS. 12A, 12B and 12C, the X-Y plane thereof is defined by the ordinate representing the position (mm) of the movable body in the focusing direction F and the abscissa representing the position (mm) of the movable body in the tracking direction T, while the Z-axis represents the normalized magnitude of the moment. A moment acting levorotatorily (i.e., in the direction opposite to that pointed by the arrow R in FIG. 6) in FIGS. 11A and 11B is represented as a positive moment in FIGS. 12A through 12C.

FIG. 12A is a graphic representation of the moment Mf to be produced by the current If flowing when the movable body 120 is driven in the focusing direction F. FIG. 12B is a graphic representation of a moment Mt to be produced by the currents It1 and It2 flowing when the movable body 120 is driven in the tracking direction T. FIG. 12C is a graph representing the sum of these moments Mf and Mt by combining all of these moments to be produced by the currents If, It1 and It2. In each of these graphs, the dark grey domain represents negative moments, while the white domain represents zero or positive moments.

The point P shown in FIG. 12A represents the state shown in FIG. 11A, while the point Q shown in FIG. 12B represents the state shown in FIG. 11B. When the movable body 120 is driven both in the focusing and tracking directions F and T simultaneously, a negative moment is produced at the point P and a positive moment is produced at the point Q. Thus, the moments at these two points P and Q cancel each other. Comparing the overall graphs shown in FIGS. 12A and 12B to each other, it can be seen that the saddles shown in FIGS. 12A and 12B have such distributions that the sign of a point on one of the two graphs is opposite to that of its associated point on the other graph. That is to say, a moment to be produced at any other focusing and tracking position on one of these two graphs and a moment to be produced at the same position on the other graph cancel each other. As a result, these moments cancel each other and just a small degree of radial tilt is generated in the objective lens driver 53 as shown in FIG. 12C.

The objective lens driver 53 achieves not just this moment canceling effect but also another canceling effect caused by the overlap of the focusing coil 105 with the tracking coils 106 through 109. Specifically, since the focusing coil 105 partially overlaps with the tracking coils 106 through 109, these coils 105 through 109 share the same magnetic flux to be generated in the gap between the first and second multipolar magnets 116 and 115. Accordingly, if any of these magnets 116 and 115 is magnetized non-uniformly, then the focusing coil 105 and the tracking coils 106 through 109 are affected by such non-uniform magnetization to the same degree.

That is to say, even if the magnetization strength of any of these magnets has changed, the variation in the moment to be produced by the focusing drive current only will have approximately the same magnitude as the variation in the moment to be produced by the tracking drive currents only. Thus, these variations cancel each other. This effect is achieved because the partially overlapping focusing and tracking coils 105 through 109 uses the same magnetic field and because the magnetization patterns and coil patterns are determined such that the two moments act in mutually opposite directions. As a result, the generation of static radial tilt can be reduced significantly, and the variations that would otherwise be caused by non-uniform magnetization of the first or second multipolar magnet 116 or 115 can also be minimized.

As described above, in this preferred embodiment, the flat focusing coil and the flat tracking coils are not arranged on the same plane but on two different planes so as to overlap with each other at least partially. Thus, the coil substrate of this preferred embodiment, including the focusing and tracking coils, can be much smaller than the conventional coil substrate including printed coils on the same plane. As a result, a downsized objective lens driver with a reduced thickness can be obtained.

Also, by optimizing the number and percentage of divided magnetized regions of the magnets and the arrangement of coil patterns with respect to the magnetization patterns, the movable body can be driven sufficiently efficiently even by the use of small magnets. Consequently, the objective lens can improve its tracking ability and the objective lens driver can perform read and write operation at an increased rate.

Furthermore, by grouping the four tracking coils into the upper and lower pairs that can be driven independently, the objective lens driver of this preferred embodiment can perform not just the conventional tracking drive operation but also a radial tilt drive operation as well. Thus, the objective lens driver also achieves further improvement in the quality of a light beam spot by correcting the radial tilt of the objective lens.

Moreover, in the objective lens driver of the preferred embodiment described above, the moment to be produced by the current that drives the movable body in the focusing direction and the moment to be produced by the currents that drive the movable body in the tracking direction cancel each other advantageously. Thus, the objective lens driver can minimize not only the static radial tilt but also the control error to be caused during the radial tilt drive operation. As a result, the objective lens driver improves the quality of the light beam spot on the disc and can contribute to reading and writing a signal from/on the disc constantly. Furthermore, the performance of the objective lens driver is hardly affected by any variation in the magnetization strength of the magnets. Thus, a huge number of objective lens drivers can be mass-produced with the variation in performance minimized.

Figure 13:
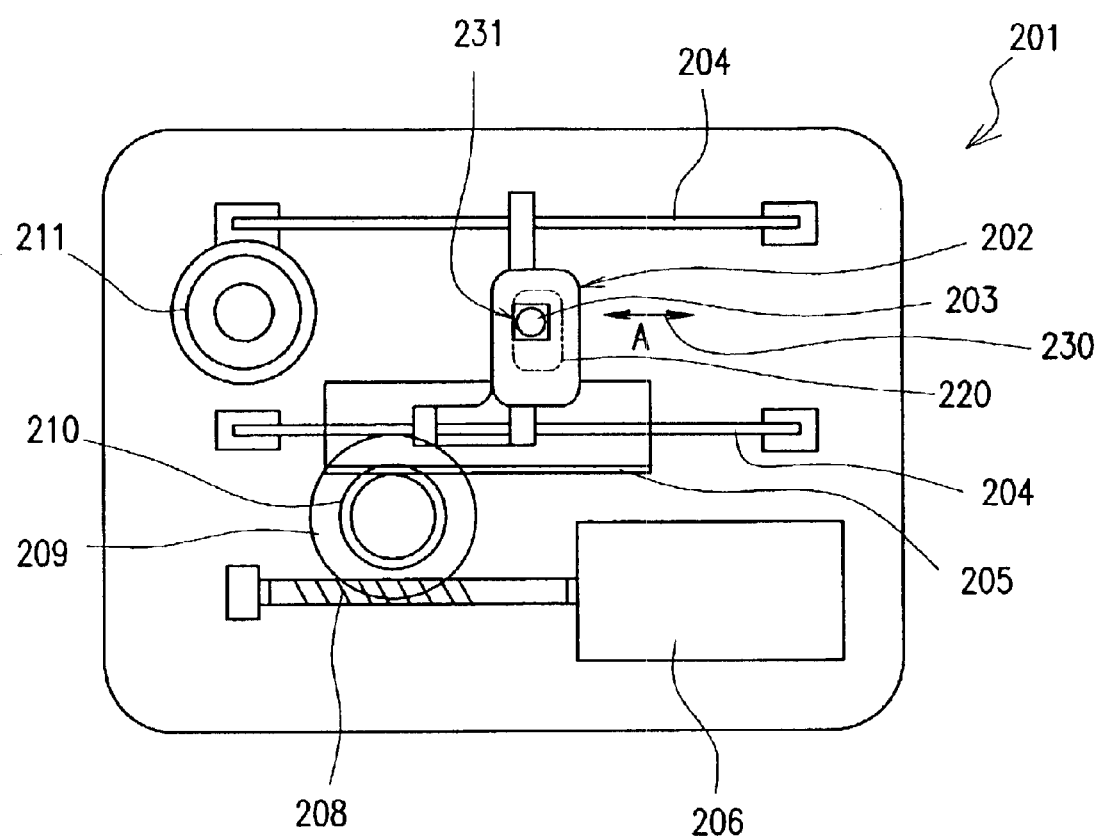
FIG. 13 is a schematic representation illustrating an optical disc drive according to a preferred embodiment of the present invention.

The objective lens driver according to any of the first through third preferred embodiments described above can be used effectively in an optical disc drive as shown in FIG. 13. The optical disc drive 201 shown in FIG. 13 includes a spindle motor 211 for rotating an optical disc thereon and an optical head 202, which is supported so as to be movable on a pair of guide shafts 204. The optical disc drive 201 further includes a sled motor 206, a lead screw 208, a worm wheel 209, a pinion gear 210 and a rack gear 205. When the sled motor 206 rotates, the rotational force of the motor 206 is transmitted to the optical head 202 by way of the lead screw 208, worm wheel 209, pinion gear 210 and rack gear 205, thereby driving the optical head 202 in the direction pointed by the arrow 230, which is the radial direction of the disc.

The optical head 202 includes an objective lens driver 220 with an objective lens 203. The objective lens driver 220 may be the objective lens driver according to any of the first through third preferred embodiments described above. The optical head 202 includes an internal light source 231 for emitting a light beam, and gets the light beam focused by the objective lens 203, thereby forming a beam spot on the data recording side of the optical disc (not shown).

As already described in detail for the first through third preferred embodiments, the objective lens 203 is driven in the focusing and tracking directions by using the focusing and tracking coils. As a result, the light beam spot on the data recording side changes its size or moves in the tracking direction. Also, when the objective lens driver of the third preferred embodiment is used, the objective lens driver can control the tilt of the objective lens and correct the radial tilt thereof.

In this optical disc drive 201, the objective lens driver 220 thereof has a smaller size and a reduced thickness and yet the objective lens 203 thereof exhibits high tracking ability. Thus, the optical disc drive 201 also has a smaller size and a reduced thickness and can read or write a hardly deteriorated signal even when information should be read or written at a relatively high rate.

Figure 14:
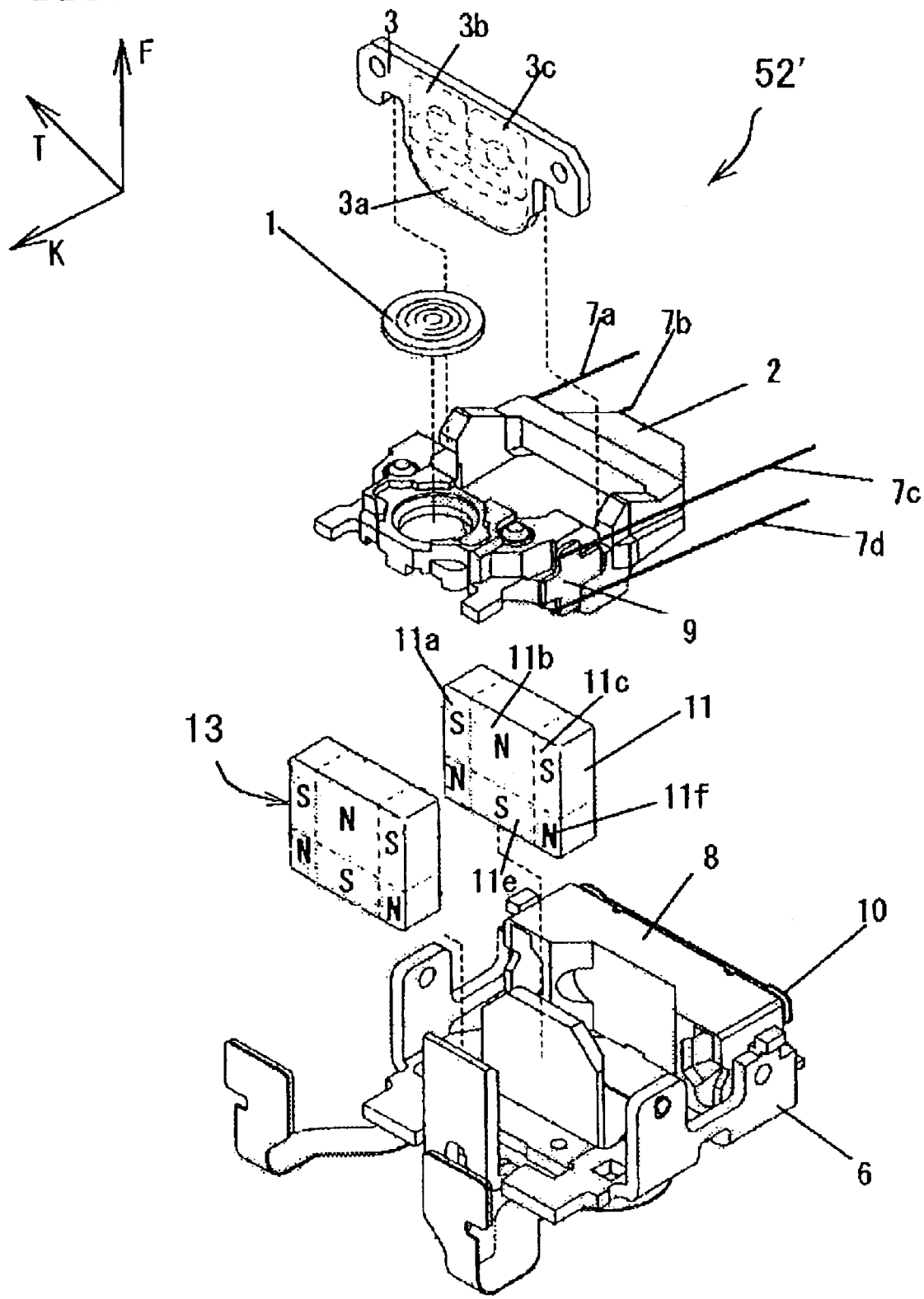
FIG. 14 is an exploded perspective view illustrating a modified example of the second preferred embodiment.
Figure 15:
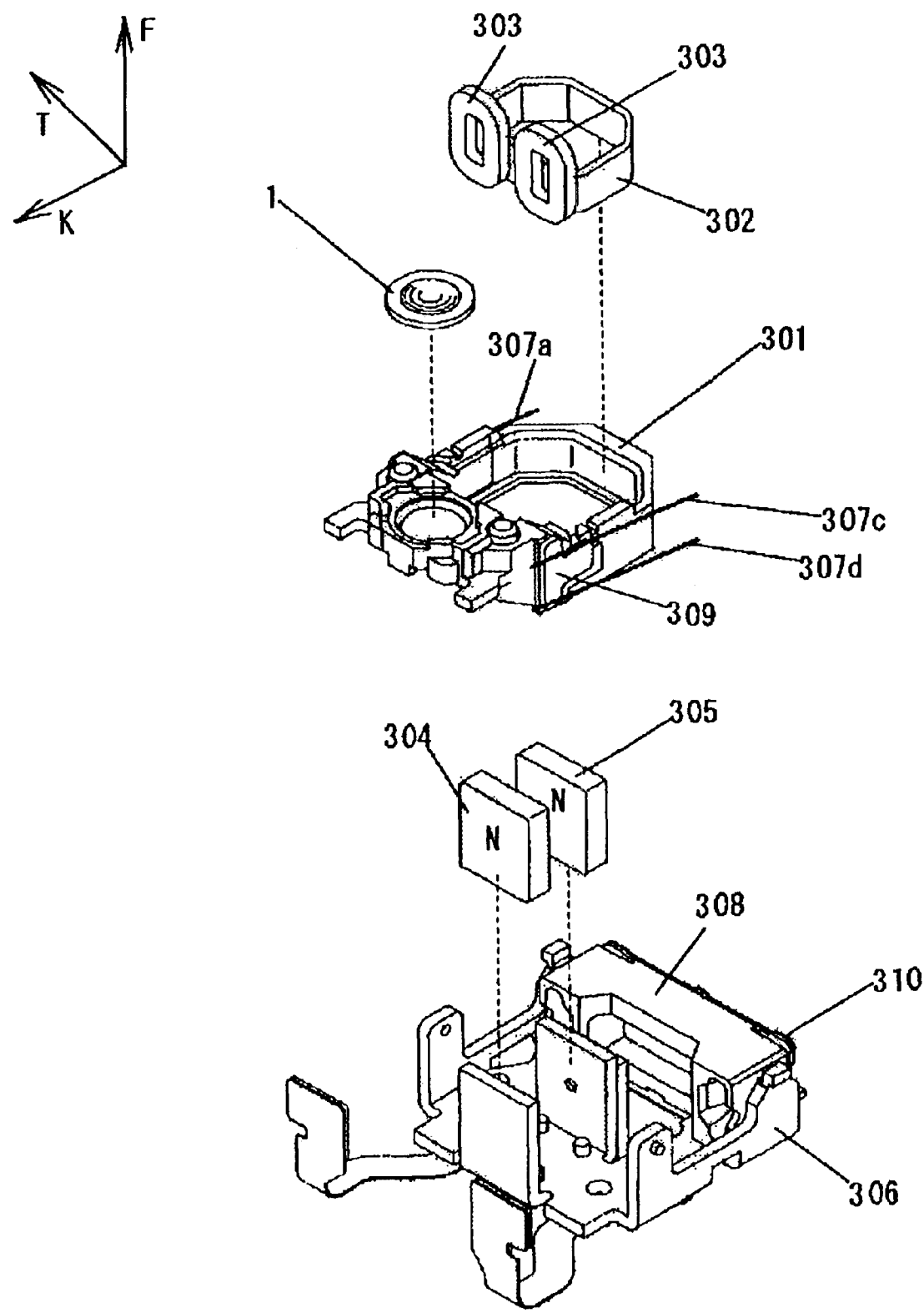
FIG. 15 is an exploded perspective view illustrating the configuration of a conventional objective lens driver.
Figure 16:
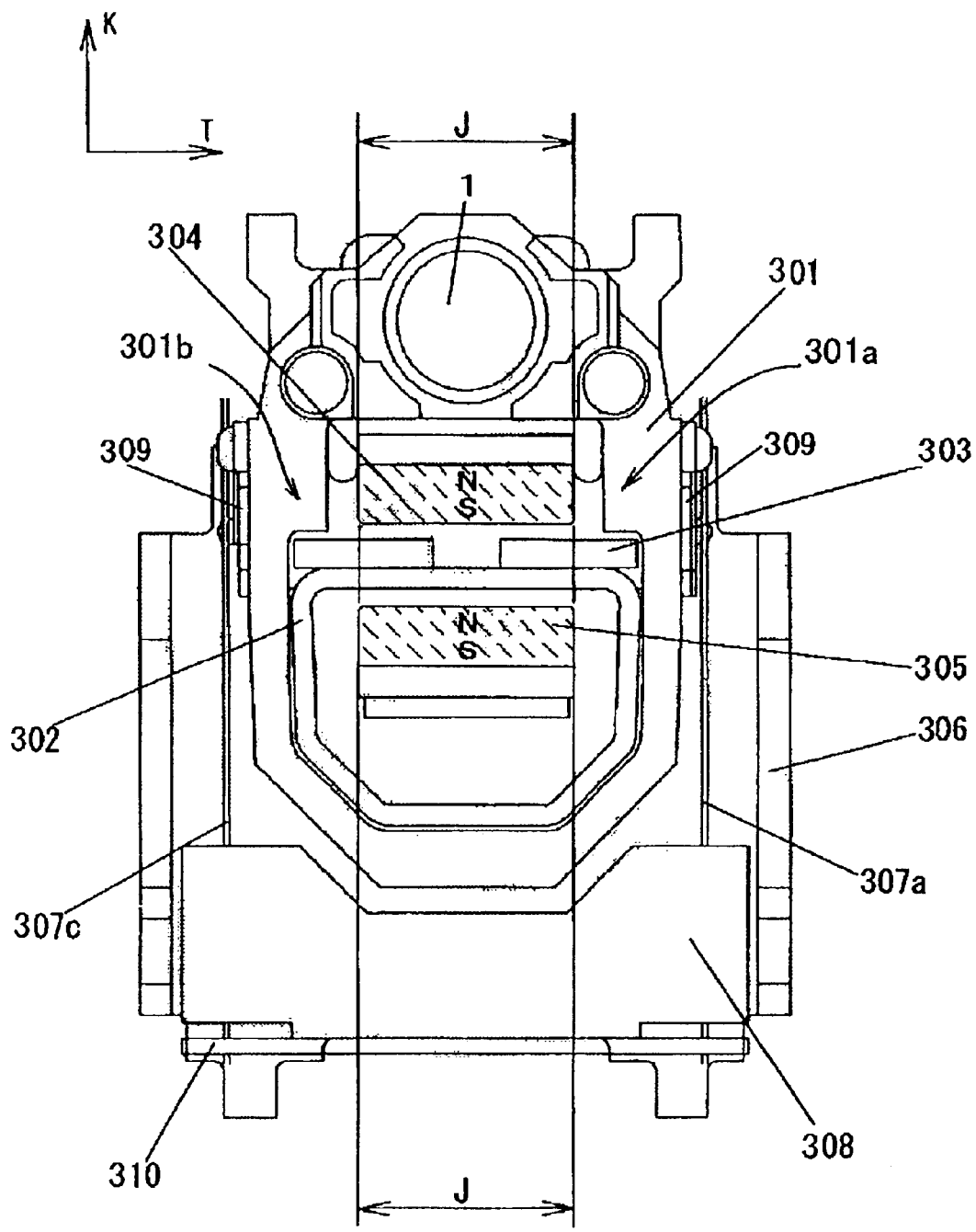
FIG. 16 is a plan view of the conventional objective lens driver shown in FIG. 15.
Figure 17A:
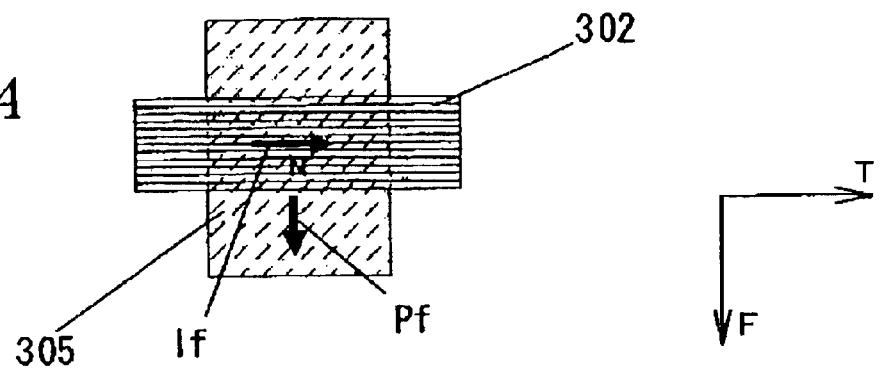
FIGS. 17A and 17C are transparent plan views of the focusing coil, tracking coils and magnets as respectively viewed in the directions U and V in FIG. 17B.
Figure 17B:
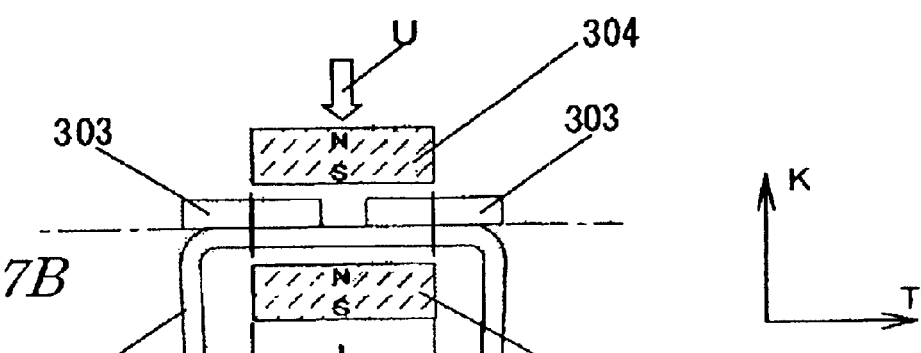
FIG. 17B is a plan view illustrating the focusing coil, tracking coils and magnets of the conventional objective lens driver shown in FIG. 15.
Figure 17C:
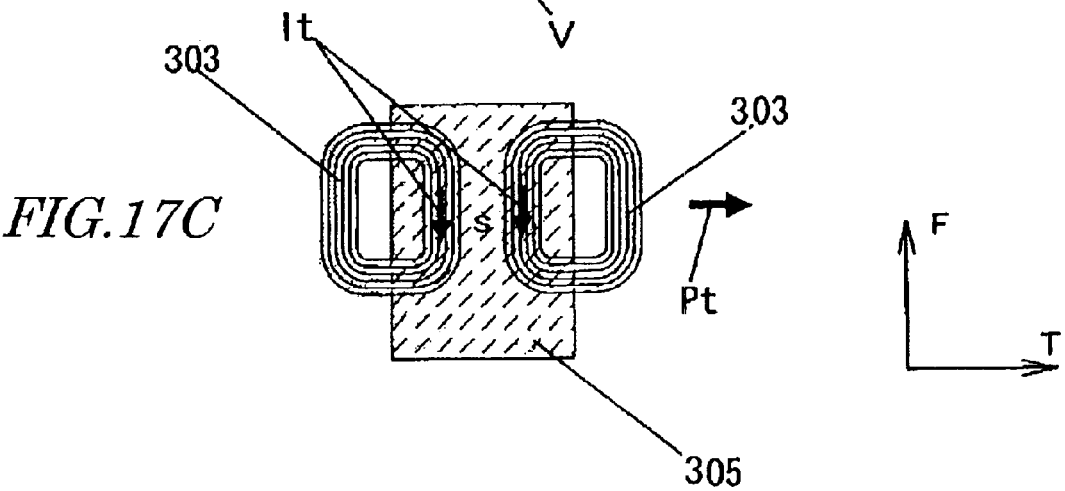

In the objective lens drivers of the first through third preferred embodiments described above, the first multipolar magnet has a smaller number of magnetic poles and a smaller size than the second multipolar magnet such that the connecting portions of the lens holder, located between the objective lens and the coil substrate, can have an increased thickness. However, if the lens holder is made of some alternative material, these connecting portions may not have to have such an increased thickness. In that case, the first multipolar magnet can have an increased size. For example, the objective lens driver 52' shown in FIG. 14 includes an alternative first multipolar magnet 11', having the same structure as the second multipolar magnet 11, in place of the first multipolar magnet 4. That is to say, the objective lens driver 52' includes the first and second multipolar magnets 11' and 11 having the same size and the same structure. Only a single type of multipolar magnets may be prepared for such an objective lens driver 52'. Thus, the objective lens driver 52' can be manufactured at a reduced cost. The objective lens driver shown in FIG. 14, including the two multipolar magnets having the same structure, is a modified example of the objective lens driver of the second preferred embodiment described above. However, the objective lens driver of the first or third preferred embodiment described above may also include the first and second multipolar magnets having the same structure.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An objective lens driver comprising:
   a movable body, which includes an objective lens to focus a light beam, a lens holder to hold the objective lens thereon, and a coil substrate, the coil substrate including a focusing coil and at least one tracking coil and being secured onto the lens holder;
   a base:
   a supporting portion for supporting the movable body much that the movable body is movable in a focusing direction and a tracking direction with respect to the baso, the focusing direction being parallel to the optical axis of the objective lens, the tracking direction being perpendicular to the focusing direction; and
   a first multipolar magnet and a second multipolar magnet, which are secured to the base so as to sandwich the coil substrate with a gap provided between each of the first and second multipolar magnets and the coil substrate,
   wherein the focusing and tracking coils are arranged as two flat coils on two mutually parallel separate planes so as to overlap with each other at least partially in a direction that is perpendicular to the focusing and tracking directions.

2. The objective lens driver of claim 1, wherein the first multipoler magnet is provided between the objective lens and the coil substrate.

3. The objective lens driver of claim 2, wherein the focusing coil is located closer to the first multipolar magnet than the tracking coil is, and
   wherein the tracking coil is located closer to the second multipolar magnet than the focusing coil is.

4. The objective lens driver of claim 2, wherein each of the first and second muitipolar magnets is divided into a plurality of magnetic pole regions, the first multipolar magnet including at least two magnetic pole regions having mutually opposite polarities that are arranged in the focusing direction, the second multipolar magnet including at least two magnetic pole regions having mutually opposite polarities that are arranged in the tracking direction.

5. The objective lens driver of claim 4, wherein the at least two manegtic pole regions of the second multipolar magnet include: a first magnetic pole region; and a second magnetic pole region, which has a U-cross section with a flat bottom extending in the tracking direction end which surrounds the first magnetic pole region, the first and second magnetic pole regions being magnetized so as to display mutually opposite polarities.

6. The objective lens driver or claim 5, wherein the first muttipolar magnet has the same structure as the second multipolar magnet.

7. The objective ions driver of claim 5, wherein the coil substrate includes two tracking coils including the at least one tracking coil, and
   wherein the two tracking coils are arranged in the tracking direction.

8. The objective lens driver of claim 5, wherein as measured in the tracking direction, the width M of the first multipolar magnet, the width N of the second multipolar magnet and the width L of the first magnetic pole region satisfy the inequality L<M<M.

9. The objective lens driver of claim 4, wherein the at least two magnetic pole regions of the second multipolar magnet include six magnetic pole regions obtained by dividing the second multipolar magnet into three columns in the tracking direction and into two rows in the focusing direction, and
   wherein the six magnetic pole regions are magnetized such that each pair of magnetic pole regions, adjacent to each other in the focusing or tracking direction, displays mutually opposite polarities, and
   wherein one of the six magnetic pole regions, which belongs to the central one of the three columns and to the upper one of the two rows, is used as a first magnetic pole region.

10. The objective lens driver of claim 9, wherein the first multipolar magnet has the same structure as the second multipolar magnet.

11. The objective lens driver of claim 9, wherein the coil substrate includes two tracking coils including the at least one tracking coil, end wherein the two tracking coils are arranged in the tracking direction.

12. The objective lens driver of claim 9, wherein as measured in the tracking direction, the width M of the first multipolar magnet, the width N of the second multipolar magnet and the width L of the first magnetic pole region satisfy the inequality L<M<N.

13. The objective lens driver of claim 4, wherein the at least two magnetic pole regions of the second multipolar magnet include mix magnetic polo regions obtained by dividing the second multipolar magnet into two rows having approximately equal widths in the focusing direction and into three columns in the tracking direction, the widths of the three columns as measured in the tracking direction substantially satisfying a ratio of one to two to one, the six magnetic pole regions being magnetized such that each pair of magnetic pole regions, adjacent to each other in the focusing or tracking direction, displays mutually opposite polarities, and wherein the at least two magnetic pole regions of the first muitipolar magnet consist of two magnetic pole regions obtained by dividing the first multipolar magnet into two rows having approximately equal widths in the focusing direction, the two magnetic pole regions being magnetized so as to display mutually opposite polarities.

14. The objective lens driver of claim 13, wherein the first multipolar magnet is almost as tall in the focusing direction as the second multipolar magnet, and wherein as measured in the tracking direction, the width of the first multipolar magnet in approximately equal to the width of the two magnetic pole regions belonging to the central column of the second multipolar magnet.

15. The objective lens driver of claim 14, wherein the first multipolar magnet is disposed so as to face the two magnetic pole regions belonging to the central column of the second multipolar magnet.

16. The objective lens driver of claim 15, wherein the supporting portion supports the movable body such that the movable body is rotatable on a rotational axis that is defined to be perpendicular to the focusing and tracking directions, and wherein the coil substrate includes four tracking coils including the at least one tracking coil, and wherein the four tracking coils are arranged symmetrically about a first axis and a second axis, the first axis passing an intersection between the rotational axis and the coil substrate and being defined to be parallel to the focusing direction, the second axis also passing the Intersection and being defined to be parallel to the tracking direction.

17. The objective lens driver of claim 16, wherein two of the four tracking coils are located over the second axis and are connected in series together to form an upper pair of coils, and wherein the two other tracking coils are located under the second axis and are connected in series together to form a lower pair of coils.

18. The objective lens driver of claim 17, wherein by supplying currents having the same phase to the upper and lower pairs of coils, the objective lens driver drives the movable body in the tracking direction, end wherein by supplying currents having opposite phases to the upper and lower pairs of coils, the objective lens driver rotates the movable body on the rotational axis.

19. The objective lens driver of claim 18, wherein the focusing coil is wound around the rotational axis.

20. An optical head comprising:

the objective lens driver of claim 1; and a light source for emitting the light beam.

21. An optical disc drive comprising:

a motor for rotating an optical disc thereon;

the optical head of claim 20 that is disposed at such a position as to form a focal point of the light beam on the optical disc; and means for moving the focal point of the light beam on the optical disc in a radial direction of the optical disc.

* * * * *

UNITED STATES PATENT AND TRADEMARK OFFICE
CERTIFICATE OF CORRECTION

PATENT NO.    : 6,791,772 B2
DATED         : September 14, 2004
INVENTOR(S)   : Kanji Wakabayashi et al.

It is certified that error appears in the above-identified patent and that said Letters Patent is hereby corrected as shown below:

Column 24,
Line 6, "much" should read -- such --;
Line 8, "baso" should read -- base --;
Line 47, "ions" should read -- lens --;
Line 56, "L<M<M" should read -- L<M<N --; and Column 18,
Line 18, "mix" should read -- six --.

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,791,772 B2
DATED : September 14, 2004
INVENTOR(S) : Kanji Wakabayashi et al.

It is certified that error appears in the above-identified patent and that said Letters Patent is hereby corrected as shown below:

Column 24,
Line 6, "much" should read -- such --;
Line 8, "baso" should read -- base --;
Line 47, "ions" should read -- lens --;
Line 56, "L<M<M" should read -- L<M<N --; and Column 25,
Line 18, "mix" should read -- six --.

This certificate supercedes Certificate of Correction issued May 24, 2005.

Signed and Sealed this

Ninth Day of August, 2005

JON W. DUDAS
*Director of the United States Patent and Trademark Office*